US012707505B2

(12) United States Patent
Ali et al.

(10) Patent No.: US 12,707,505 B2
(45) **Date of Patent: *Aug. 11, 2026**

(54) INDICATING BEAM CORRESPONDENCE USING A RACH PROCEDURE

(71) Applicant: Lenovo (Singapore) Pte. Ltd., New Tech Park (SG)

(72) Inventors: Ali Ramadan Ali, Kraiburg am Inn (DE); Ankit Bhamri, Rödermark (DE); Karthikeyan Ganesan, Kronberg im Taunus (DE); Alexander Johann Maria Golitschek Edler von Elbwart, Darmstadt (DE); Joachim Loehr, Wiesbaden (DE); Prateek Basu Mallick, Dreieich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/803,167

(22) Filed: Aug. 13, 2024

(65) Prior Publication Data

US 2024/0405837 A1 Dec. 5, 2024

Related U.S. Application Data

(63) Continuation of application No. 17/796,471, filed as application No. PCT/IB2021/050738 on Jan. 29, 2021, now Pat. No. 12,095,540.

(Continued)

(51) Int. Cl.
*H04W 74/0833* (2024.01)
*H04W 74/0836* (2024.01)

(52) U.S. Cl.
CPC .... *H04W 74/0833* (2013.01); *H04W 74/0836* (2024.01)

(58) Field of Classification Search
CPC ............ H04B 7/0639; H04W 74/0833; H04W 74/0836; H04W 56/00
See application file for complete search history.

(56) References Cited

U.S. PATENT DOCUMENTS 12,095,540 B2 * 9/2024 Ali ....................... H04B 7/0639
2017/0359114 A1 12/2017 Akkarakaran et al.

(Continued)

FOREIGN PATENT DOCUMENTS

WO 2020006769 A1 1/2020

OTHER PUBLICATIONS

Samsung, "New WID: Further enhancements on MIMO for NR", 3GPP TSG RAN Meeting #86 RP-193133, Dec. 9-12, 2019, pp. 1-5.

(Continued)

*Primary Examiner* — David B Lugo
(74) *Attorney, Agent, or Firm* — Kunzler Needham Hilton

(57) ABSTRACT

Apparatuses, methods, and systems are disclosed for UL beam/panel selection indication. One apparatus includes a transceiver comprising a plurality of UE panels associated with one or more beams, the transceiver receiving a plurality of SSBs on at least two UE panels. The apparatus includes a processor that determines a corresponding set of UE panels from the SSBs and sends, via the transceiver, an indication of the corresponding set of UE panels from the apparatus to a RAN node using a random-access procedure.

20 Claims, 14 Drawing Sheets

Related U.S. Application Data

(60) Provisional application No. 62/967,488, filed on Jan. 29, 2020.

(56) References Cited

U.S. PATENT DOCUMENTS

| | | | |
|---|---|---|---|
| 2019/0029036 | A1 | 1/2019 | Wilson et al. |
| 2019/0029049 | A1 | 1/2019 | Akkarakaran et al. |
| 2019/0053271 | A1 | 2/2019 | Islam et al. |
| 2019/0110314 | A1 | 4/2019 | Abedini et al. |
| 2019/0215220 | A1 | 7/2019 | Islam et al. |
| 2020/0029383 | A1 | 1/2020 | Venugopal et al. |
| 2020/0099439 | A1 | 3/2020 | Mundarath et al. |
| 2020/0100297 | A1 | 3/2020 | Agiwal et al. |
| 2022/0239440 | A1 | 7/2022 | Go et al. |
| 2022/0338272 | A1 | 10/2022 | Ohara et al. |

OTHER PUBLICATIONS

Intel Corporation, "New SID: Study on supporting NR from 52.6GHz to 71 GHz", 3GPP TSG RAN Meeting #86 RP-193259, Dec. 9-12, 2019, pp. 1-3.

3GPP, "3rd Generation Partnership Project; Technical Specification Group Radio Access Network; NR; Physical channels and modulation (Release 16)", 3GPP TS 38.211 V16.0.0, Sep. 2019, pp. 1-129.

3GPP, "3rd Generation Partnership Project; Technical Specification Group Radio Access Network; NR; Physical layer procedures for control (Release 16)", 3GPP TS 38.213 V16.0.0, Dec. 2019, pp. 1-146.

* cited by examiner

| PRACH Configuration Index | Preamble format | $n_{SPN}$ mod $x = y$ | | Subframe number | Starting Symbol | Number of PRACH slots within a subframe | $N_t^{RA,slot}$ number of time-domain PRACH occasions within a PRACH slot | $N_{dur}^{RA}$ PRACH duration |
|---|---|---|---|---|---|---|---|---|
| | | $x$ | $y$ | | | | | |
| 0 | 0 | 16 | 1 | 9 | 0 | - | - | 0 |
| 1 | 0 | 8 | 1 | 9 | 0 | - | - | 0 |
| 2 | 0 | 4 | 1 | 9 | 0 | - | - | 0 |
| 3 | 0 | 2 | 0 | 9 | 0 | - | - | 0 |
| 4 | 0 | 2 | 1 | 9 | 0 | - | - | 0 |
| 5 | 0 | 2 | 0 | 4 | 0 | - | - | 0 |
| 6 | 0 | 2 | 1 | 4 | 0 | - | - | 0 |
| 7 | 0 | 1 | 0 | 9 | 0 | - | - | 0 |
| 8 | 0 | 1 | 0 | 8 | 0 | - | - | 0 |
| 9 | 0 | 1 | 0 | 7 | 0 | - | - | 0 |
| 10 | 0 | 1 | 0 | 6 | 0 | - | - | 0 |
| 11 | 0 | 1 | 0 | 5 | 0 | - | - | 0 |
| 12 | 0 | 1 | 0 | 4 | 0 | - | - | 0 |
| 13 | 0 | 1 | 0 | 3 | 0 | - | - | 0 |
| 14 | 0 | 1 | 0 | 2 | 0 | - | - | 0 |
| 15 | 0 | 1 | 0 | 1, 6 | 0 | - | - | 0 |
| 16 | 0 | 1 | 0 | 1, 6 | 7 | - | - | 0 |
| 17 | 0 | 1 | 0 | 4, 9 | 0 | - | - | 0 |
| 18 | 0 | 1 | 0 | 3, 8 | 0 | - | - | 0 |
| 19 | 0 | 1 | 0 | 2, 7 | 0 | - | - | 0 |

Panel#0

Panel#1

Panel#2

| PRACH Configuration Index | Preamble format | $n_{SPN}$ mod $x = y$ | | Subframe number | Panel ID | Starting Symbol | Number of PRACH slots within a 60 kHz slot | $N_t^{RA,slot}$ number of time-domain PRACH occasions within a PRACH slot | $N_{dur}^{RA}$ PRACH duration |
|---|---|---|---|---|---|---|---|---|---|
| | | $x$ | $y$ | | | | | | |
| 0 | A1 | 16 | 1 | {4,9}{14,19}{24,29}{34,39} | 0, 1, 2, 3 | 0 | 2 | 6 | 2 |
| 1 | A1 | 16 | 1 | {3,7,11,15,19}{23,27,31,35,39} | 0 | 0 | 1 | 6 | 2 |
| 2 | A1 | 8 | 1, 2 | 9,19,29,39 | 0 | 0 | 2 | 6 | 2 |
| 3 | A1 | 8 | 1 | 4,9,14,19,24,29,34,39 | 0 | 0 | 2 | 6 | 2 |
| 4 | A1 | 8 | 1 | 3,7,11,15,19,23,27,31,35,39 | 0 | 0 | 1 | 6 | 2 |
| 5 | A1 | 4 | 1 | 4,9,14,19,24,29,34,39 | 0 | 0 | 1 | 6 | 2 |
| 6 | A1 | 4 | 1 | 4,9,14,19,24,29,34,39 | 0 | 0 | 2 | 6 | 2 |

FIG. 4

INDICATING BEAM CORRESPONDENCE USING A RACH PROCEDURE

CROSS-REFERENCE TO RELATED APPLICATIONS

This application claims priority to U.S. patent application Ser. No. 17/796,471 entitled "INDICATING BEAM CORRESPONDENCE USING A RACH PROCEDURE" and filed on Jul. 29, 2022 for Ali Ramadan Ali, Ankit Bhamri, Karthikeyan Ganesan, Alexander Golitschek Edler von Elbwart, Joachim Löhr, and Prateck Basu Mallick, and claims priority to PCT Patent Application Number PCT/IB2021/050738 entitled "INDICATING BEAM CORRESPONDENCE USING A RACH PROCEDURE" and filed on Jan. 29, 2021 for Ali Ramadan Ali, Ankit Bhamri, Karthikeyan Ganesan, Alexander Golitschek Edler von Elbwart, Joachim Löhr, and Prateek Basu Mallick, and claims priority to U.S. Provisional Patent Application No. 62/967,488 entitled "UL PANEL SELECTION DURING INITIAL ACCESS" and filed on Jan. 29, 2020 for Ali Ramadan Ali, Ankit Bhamri, Karthikeyan Ganesan, Alexander Golitschek Edler von Elbwart, Joachim Löhr, and Prateek Basu Mallick, which application is incorporated herein by reference.

FIELD

The subject matter disclosed herein relates generally to wireless communications and more particularly relates to UL panel selection during initial access, for example, radio access in frequencies above 52.6 GHz.

BACKGROUND

The following abbreviations are herewith defined, at least some of which are referred to within the following description: Third Generation Partnership Project ("3GPP"), 5th Generation ("5G"), 5G Access Network ("5G-AN"), 5G Core Network ("5GC" or "5C-CN"), 5G System ("5GS"), Positive-Acknowledgment ("ACK"), Application Function ("AF"), Access and Mobility Management Function ("AMF"), Application Programming Interface ("API"), Access Stratum ("AS"), Authentication Server Function ("AUSF"), Base Station ("BS"), Carrier Aggregation ("CA"), Component Carrier ("CC"), Common Control Channel ("CCCH"), Common Control Channel Service Data Unit ("CCCH SDU"), Code Division Multiple Access ("CDMA"), Cancellation Index ("CI"), Core Network ("CN"), Channel State Information ("CSI"), CSI Reference Signal ("CSI-RS"), Dual Connectivity ("DC"), Downlink Control Information ("DCI"), Downlink ("DL"), Demodulation Reference Signal ("DM-RS"), Data Network Name ("DNN"), Data Radio Bearer ("DRB"), Discontinuous Transmission ("DTX"), Evolved Node B ("eNB"), Evolved Packet Core Network ("EPC"), Frequency Range Between 410 MHz to 7.125 GHz ("FR1"), Frequency Range Between 24.25 GHz to 52.6 GHz ("FR2"), 5G/NR Node B ("gNB"), General Packet Radio Service ("GPRS"), Global System for Mobile Communications ("GSM", i.e., a 2G digital cellular network), Hybrid Automatic Repeat Request ("HARQ"), Identity ("ID"), Internet Protocol ("IP"), Layer-1 ("L1", also known as the Physical Layer), Layer 1 Identifier ("L1 ID"), Layer-2 ("L2", also known as the Link Layer), Layer 2 Identifier ("L2 ID"), Layer-3 ("L3", also known as the Network Layer), Listen-Before-Talk ("LBT"), Logical Channel ("LCH"), LCH ID ("LCID"), Long Term Evolution ("LTE"), Medium Access Control ("MAC"), Medium Access Control Element ("MAC CE"), Mobility Management Entity ("MME"), Maximum Permissible Exposure ("MPE"), MsgA PUSCH Occasion ("MPO"), Message A ("MsgA", refers to the first message of a 2-step random access procedure), Message B ("MsgB", refers to the second message of a 2-step random access procedure), Negative-Acknowledgment ("NACK") or ("NAK"), Non Access Stratum ("NAS"), Network Exposure Function ("NEF"), Network Function ("NF", e.g., a network entity performing a well-defined function, such as AMF, SMF, PCF, UDM, etc.), New Radio ("NR"), NR in Unlicensed Spectrum ("NR-U"), Network Slice Selection Assistance Information ("NSSAI", e.g., a vector value including one or more S-NSSAI values), Physical Broadcast Channel ("PBCH"), Policy Control Function ("PCF"), Physical Downlink Control Channel ("PDCCH"), Physical Downlink Shared Channel ("PDSCH"), Packet Data Unit ("PDU"), Physical Layer ("PHY"), Public Land Mobile Network ("PLMN"), Physical Random Access Channel ("PRACH"), Physical Uplink Control Channel ("PUCCH"), Physical Uplink Shared Channel ("PUSCH"), Quality of Service ("QoS"), Quasi-Co-Location ("QCL"), Random-Access ("RA"), Random Access Procedure ("RACH"), Radio Access Network ("RAN"), Random Access Response ("RAR"), Radio Resource Control ("RRC"), Reference Signal ("RS", e.g., DM-RS, CSI RS), RS Received Power ("RSRP"), Receive ("RX"), Shared Channel ("SCH"), Service Data Unit ("SDU"), System Information Block ("SIB"), SIB Number N ("SIBN," where N is in integer value that points to a supported SIB), Session Management Function ("SMF"), Single Network Slice Selection Assistance Information ("S-NSSAI"), SRS Resource Indicator ("SRI"), Sounding Reference Signal ("SRS"), Synchronization Signal ("SS"), Synchronization Signal/Physical Broadcast Channel ("SS/PBCH"), Synchronization Signal Block ("SSB"), SS/PBCH Block Resource Index ("SSBRI"), Transport Block ("TB"), Transmission Configuration Indicator ("TCI"), Time Division Multiplex ("TDM"), Transmit ("Tx"), Unified Data Management ("UDM"), Unified Data Repository ("UDR"), User Entity/Equipment (Mobile Terminal) ("UE", e.g., comprising a mobile equipment ("ME") and subscriber identity/identification module ("SIM")), Uplink ("UL"), Universal Mobile Telecommunications System ("UMTS"), User Plane ("UP"), User Plane Function ("UPF"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received and DTX means that no TB was detected.

Certain wireless communication systems may support radio communication in the frequency range from 52.6 GHz to 71 GHz. 3GPP Release 15 assumes beam correspondence during initial access and the selection of UL beam and/or panel for RACH preamble transmission is based on the signal strength of the DL SSB reception. However, a UE operating in higher frequency (e.g., 52.6 GHz to 71 GHz) may use multiple set of beams and/or panels.

BRIEF SUMMARY

Disclosed are procedures for UL beam/panel selection indication. Said procedures may be implemented by apparatus, systems, methods, or computer program products.

One method of a UE includes receiving a plurality of SSBs on at least two beams and determining a corresponding set of beams from the SSBs. The method includes sending an indication of the corresponding set of beams from the UE to a RAN node using a random-access procedure.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a diagram illustrating one embodiment of random-access configurations;

FIG. 4 is a diagram illustrating one embodiment of explicit indication of panels that can be used by UEs for PRACH preamble transmission;

DETAILED DESCRIPTION

Figure 1:
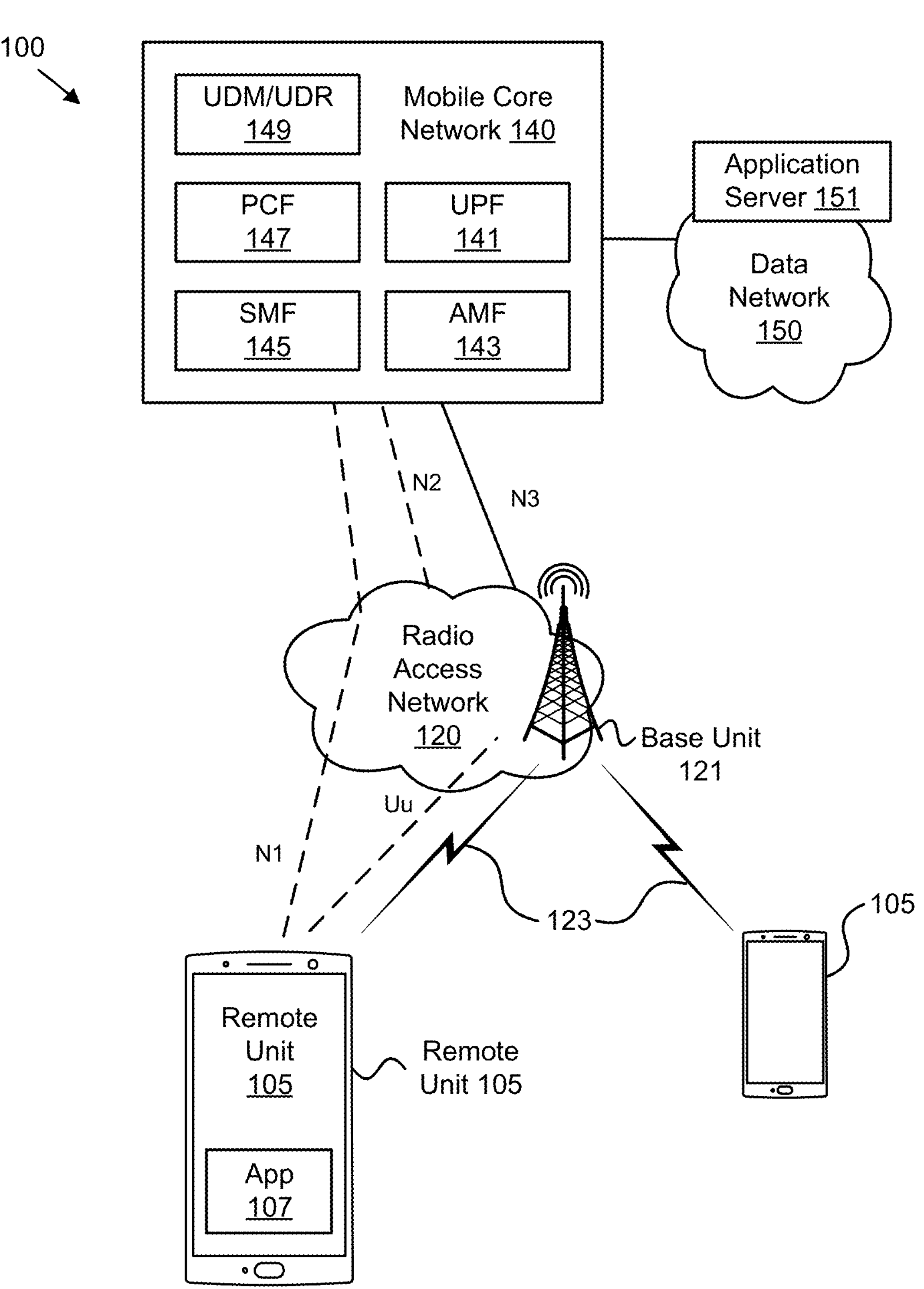
FIG. 1 is a schematic block diagram illustrating one embodiment of a wireless communication system for UL beam/panel selection indication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for UL beam/panel selection during initial access for NR operating in the millimeter band above the FR2, e.g., from 52.6 GHz to 71 GHz. Similar to regular NR and NR-U operations below 52.6 GHZ, NR/NR-U operation in the 52.6 GHz to 71 GHz may be in stand-alone or aggregated via CA or DC with an anchor carrier.

Conventional selection techniques for initial access defined in 3GPP Rel-15 do not support the UE using multiple beams/panels. Disclosed herein are new UE behaviors supporting NR operation between 52.6 GHz and 71 GHz using existing DL/UL NR waveform. Specifically, the disclosed solutions describe channel access mechanism, considering potential interference to/from other nodes, assuming beam based operation, in order to comply with the regulatory requirements applicable to unlicensed spectrum for frequencies between 52.6 GHz and 71 GHZ. Also disclosed are UE behaviors that facilitate UL beam selection for UEs equipped with multiple panels, considering UL coverage loss mitigation due to MPE, based on UL beam indication with the unified TCI framework for UL fast panel selection.

In high frequency bands above 52.6 GHZ, narrow beams are required at gNB and UE to enhance DL and UL coverage. Due to the small wavelength, a UE can be equipped with high number of narrow beams and panels. Due to these narrow beams as well as the MPE issue at UE, aligning and selecting DL/UL beams need extra effort specially during the initial access.

In 3GPP Release 15, beam correspondence during initial access is assumed and the UE selects of UL beam and/or panel for RACH preamble transmission based on the signal strength of the DL SSB reception. Per 3GPP Release 15, prior to initiation of the physical random access procedure, the Layer 1 entity receives (from higher layers) a set of SS/PBCH block indexes and provides to higher layers a corresponding set of RSRP measurements. Additionally, the Layer 1 entity may receive (from higher layers) an indication to perform a Type-1 random access procedure, or a Type-2 random access prior to initiation of the physical random access procedure.

From the physical layer perspective, the Type-1 L1 random access procedure includes the transmission of random access preamble (Msg1) in a PRACH, random access response (RAR) message with a PDCCH/PDSCH (Msg2), and when applicable, the transmission of a PUSCH scheduled by a RAR UL grant, and PDSCH for contention resolution.

From the physical layer perspective, the Type-2 L1 random access procedure includes the transmission of random access preamble in a PRACH and of a PUSCH (MsgA) and the reception of a RAR message with a PDCCH/PDSCH (MsgB), and when applicable, the transmission of a PUSCH scheduled by a RAR UL grant, and PDSCH for contention resolution.

If a random access procedure is initiated by a PDCCH order to the UE, a PRACH transmission is with a same SCS as a PRACH transmission initiated by higher layers. If a UE is configured with two UL carriers for a serving cell and the UE detects a PDCCH order, the UE uses the UL/SUL indicator field value from the detected PDCCH order to determine the UL carrier for the corresponding PRACH transmission.

There are 64 preambles defined in each time-frequency PRACH occasion, enumerated in increasing order of first increasing cyclic shift C, of a logical root sequence, and then in increasing order of the logical root sequence index, starting with the index obtained from the higher-layer parameter prach-RootSequenceIndex or rootSequenceIndex-BFR or by msgA-prach-RootSequenceIndex if configured.

UE selects the initial preamble transmit power based on estimates of the downlink path loss in combination with a target received preamble power configured by the network. The path loss should be estimated based on the received power of the SS block that the device has acquired and from which it has determined the RACH resource to use for the preamble transmission. This is aligned with an assumption that if the preamble transmission is received by means of beam-forming the corresponding SS block is transmitted with a corresponding beam-shaper. If no random-access response is received within a predetermined window, the device can assume that the preamble was not correctly received by the network, most likely due to the fact that the preamble was transmitted with too low power. If this happens, the device repeats the preamble transmission with the preamble transmit power increased by a certain configurable offset. This power ramping continues until a random-access response has been received or until a configurable maximum number of retransmissions has been carried out, alternatively a configurable maximum preamble transmit power has been reached. In the two latter cases, the random-access attempt is declared as a failure.

The beamforming operation has an impact on the RACH procedure, as discussed below with reference to FIG. 2. Once the UE has detected the cell from the strongest SS Block, it needs to use RACH resources that correspond to the best beam direction toward the UE. The UE will use a power ramping procedure if it does not receive the response for the PRACH preamble, and the UE will then transmit the preamble with a higher transmit power at the next suitable resource. The gNB will use the beam direction based on PRACH detection until further measurements are received from the UE.

The UE receives a configuration for PRACH transmission, and these resources are associated with periodic CSI-RS or SS Blocks, which are used as Beam-Failure Reference Signal (BFRS). The association between the CSI-RS/SS Blocks and PRACH resources also implies that the detected DL beam will be used for UL transmission; hence, the concept of beam correspondence is applied. The BFRQ may also be transmitted in a contention-based manner (CBRA), a situation in which the UE is utilizing the contention-based RACH procedure where preamble resources are mapped to downlink signals. In case both CSI-RS and SS Blocks are configured for the UE, the PRACH preambles are associated with the SS Blocks only; in this case, the CSI-RS resources used for new beam identification are found based on the QCL association with the SS Block. On the other hand, there is also the possibility of associating PRACH preambles with either CSI-RS or SS Blocks.

Once the UE transits the BFRQ, it also monitors for an answer from the gNB so that it is acknowledged on the receipt of this information. The monitoring for the recovery request response implies the monitoring of the PDCCH with the assumption that this is spatially QCL-ed with the RS of the identified beam. This monitoring is done during a preconfigured time window, and if the UE does not receive any answer from the gNB, it retransmits the recovery request.

In higher frequency—especially considering unlicensed access—the likelihood of success for LBT access mechanism may be increased by exploiting multiple set of beams and/or panels. Identifying set of beams and/or panels for UL during initial access and associating the multiple UL beams and/or panels to the same UE enables the UE to perform parallel LBT using multiple beams and/or panels.

However, if a UE is able to transmit multiple PRACH preambles from multiple beam(s)/panel(s), then the base station (e.g., gNB/eNB) must be able to associate these preambles are with beam(s)/panel(s) belonging to a single UE and not to multiple UEs.

To remedy the challenges of initial UE access using multiple beams/panels, a new UE procedure is defined for multi-preamble generation and transmission using multiple panels/beams. Also described herein are new UE/base station procedures for UL panel/beam indication in the idle mode. For uplink, there may be an implicit indication of the used Tx panel(s)/beam(s) of Msg1 based on preamble ID. Alternatively, there may be an implicit indication of the used Tx panel(s)/beam(s) of MsgA based on DMRS sequence used for MsgA PUSCH. In other embodiments, there may be explicit indication of the used Tx panel(s)/beam(s) of MsgA via MsgA's PUSCH. On the downlink, there may be explicit UL/Tx panel/beam indications to the UE via PDCCH.

Additional entries to RRC RACH configuration tables are proposed for enabling multiple panels/beams for PRACH preamble transmission.

In the following descriptions, the terms antenna, panel, antenna panel, device panel and UE panel are used interchangeably. An antenna panel may be a hardware that is used for transmitting and/or receiving radio signals at frequencies lower than 6 GHz, e.g., frequency range 1 (FR1), or higher than 6 GHz, e.g., frequency range 2 (FR2) or millimeter wave (mmWave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency (RF) chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device antenna panel (e.g., of a UE or RAN node) may be a physical or logical antenna array comprising a set of antenna elements or antenna ports that share a common or a significant portion of an RF chain (e.g., in-phase/quadrature (I/Q) modulator, analog to digital (A/D) converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier (LNA) power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to gNB. For certain condition(s), gNB or network can assume the mapping between device's physical antennas to the logical entity "device panel" may not be changed. For example, the condition may include until the next update or report from device or comprise a duration of time over which the gNB assumes there will be no change to the mapping.

A device may report its capability with respect to the "device panel" to the gNB or network. The device capability may include at least the number of "device panels." In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. For example, qcl-Type may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}.

Spatial Rx parameters may include one or more of: angle of arrival (AoA) Dominant AoA, average AoA, angular spread, Power Angular Spectrum (PAS) of AoA, average AoD (angle of departure), PAS of AoD, transmit/receive channel correlation, transmit/receive beamforming, spatial channel correlation, etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to quasi co-location type parameter(s) indicated in the corresponding TCI state. A device can receive a configuration of a plurality of transmission configuration indicator states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

FIG. 1 depicts a wireless communication system 100 for UL beam/panel selection indication, in accordance with aspects of the present disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 (or other communication peer) via a network connection with the mobile core network 140. For example, an application 107 in a remote unit 105 (e.g., web browser, media client, telephone/VoIP application) may trigger the remote unit 105 to establish a PDU session (or other data connection) with the mobile core network 140 using the RAN 120 (e.g., a 3GPP access network and/or non-3GPP access network). The mobile core network 140 then relays traffic between the remote unit 105 and the data network 150 (e.g., application server 151) using the PDU session. The PDU session represents a logical connection between the remote unit 105 and the UPF 141. In order to establish the PDU session, the remote unit 105 must be registered with the mobile core network. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data networks and/or other communication peers.

The base units 121 may be distributed over a geographic region. In certain embodiments, a base unit 121 may also be referred to as an access terminal, an access point, a base, a base station, a Node-B, an eNB, a gNB, a Home Node-B, a relay node, or by any other terminology used in the art. The base units 121 are generally part of a radio access network ("RAN"), such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141. The different network slices are not shown in FIG. 1 for case of illustration, but their support is assumed.

Although specific numbers and types of network functions are depicted in FIG. 1, one of skill in the art will recognize that any number and type of network functions may be included in the mobile core network 140. Moreover, while FIG. 1 depicts components of a 5G RAN and a 5G core network, the described embodiments for UL beam/panel selection indication apply to other types of communication networks, including IEEE 802.11 variants, GSM, GPRS, UMTS, LTE variants, CDMA 2000, Bluetooth, ZigBee, Sigfoxx, and the like. For example, in an LTE variant involving an EPC, the AMF 141 may be mapped to an MME, the SMF 143 may be mapped to a control plane portion of a PGW and/or to an MME, the UPF 145 may be mapped to an SGW and a user plane portion of the PGW, the UDM/UDR 149 may be mapped to an HSS, etc.

In various embodiments, the remote units 105 supports multiple beam/panel operation, thereby allowing fast UL Tx beam/panel selection during initial access. Identifying a set of UL beams and/or panels increases the success rate of LBT compared to performing LBT using a single UL beams and/or panels, thereby reducing latency for the channel access by switching beams and/or panels when LBT access fails in one of them. Additionally, using multiple preamble transmissions from plurality of beams and/or panels increases PRACH detection probability and hence enhances the RACH procedure performance.

According to a first solution, the base unit 121 enables the remote unit 105 to use multiple preamble transmissions via RRC RACH configuration. Here, the base unit 121 configures in-coverage remote units 105 to use multiple preambles using multiple Tx beam(s)/panel(s) by increasing the number of the possible preambles a remote unit 105 can generate, grouping them with a Tx beam/panel and associating the preamble transmission from a plurality of beams and/or panels to the remote unit 105.

According to a second solution, the remote unit 105 may transmit multiple PRACH preambles using multiple panels and/or multiple beams when performing Type-1 random access (i.e., four-step RACH procedure). Upon detecting SSB signals via Rx beam(s)/panel(s), the remote unit 105 determines the possible UL Tx beam(s)/panel(s) associated with the strongest SSB beam(s). Based on its capability, power status, and MPE (Maximum Permissible Exposure) condition, etc., the remote unit 105 generates one or more PRACH preambles, each is associated with a beam/panel ID using the corresponding rootSequence index or RACH configuration index and simultaneously transmits them or in a time domain manner by one or more beam(s)/panel(s).

According to a third solution, the remote unit 105 may transmit a single preamble or multiple preambles by switching between different beams/panels when performing Type-2 random access (i.e., two-step RACH procedure). Upon detecting SSB signals from Rx beam(s)/panel(s), the remote unit 105 determines the possible UL Tx beam(s)/panel(s) associated with the strongest SSB beam(s) detected from Rx beam(s)/panel(s). In one example, the remote unit 105 generates a single PRACH preamble based on RRC RACH configuration and switches between beams/panels for the preamble transmission on the configured RACH opportunities.

According to the fourth solution, for both Type-1 and Type-2 random access (two/four-step RACH), the remote unit 105 switches to different beam(s)/panel(s). For example, if the initial RACH trial was not successful (i.e., the remote unit 105 did not receive the RAR message (a response for the PRACH preamble) during a configured time window), then the remote unit 105 may retransmit the preamble(s) using different beam(s)/panel(s).

According to the fifth solution, the base unit 121 immediately indicates the first decoded preamble associated with a Tx beam/panel. For example, if the remote unit 105 is configured to switch beam(s)/panel(s) for different PRACH subframes/slots, then the base unit 121—upon decoding the first preamble from the remote unit 105—may immediately send a RAR message to the remote unit 105 indicating the first Tx beam/panel to be used. For later decoded PRACH preambles, an update/refining of the selected beam(s)/panel(s) may be sent by the DL PDCCHs upon decoding other preambles.

To enable multiple beams/panels for PRACH preamble transmission, the RRC RACH configuration tables at the remote unit 105 may be modified to include additional entries. Additionally, the remote unit 105 and/or base unit 121 may perform UL beam/panel indication in the idle mode. In certain embodiments, there is an implicit indication of the used UL Tx beam(s)/panel(s) of Msg1 based on preamble ID. In certain embodiments, there is an implicit indication of the used UL Tx beam(s)/panel(s) of MsgA based on DMRS sequence used for MsgA PUSCH. In certain embodiments, there is an explicit indication of the used UL Tx beam(s)/panel(s) of MsgA via MsgA's PUSCH. In certain embodiments, there is an explicit UL beam/panel indications to the remote unit 105 via PDCCH.

In the following descriptions, the term RAN node is used for the base station, but it is replaceable by any other radio access node, e.g., BS, CNB, gNB, AP, NR, etc. Further the operations are described mainly in the context of 5G NR. However, the proposed solutions/methods are also equally applicable to other mobile communication systems supporting UL beam/panel selection indication.

Figure 2:
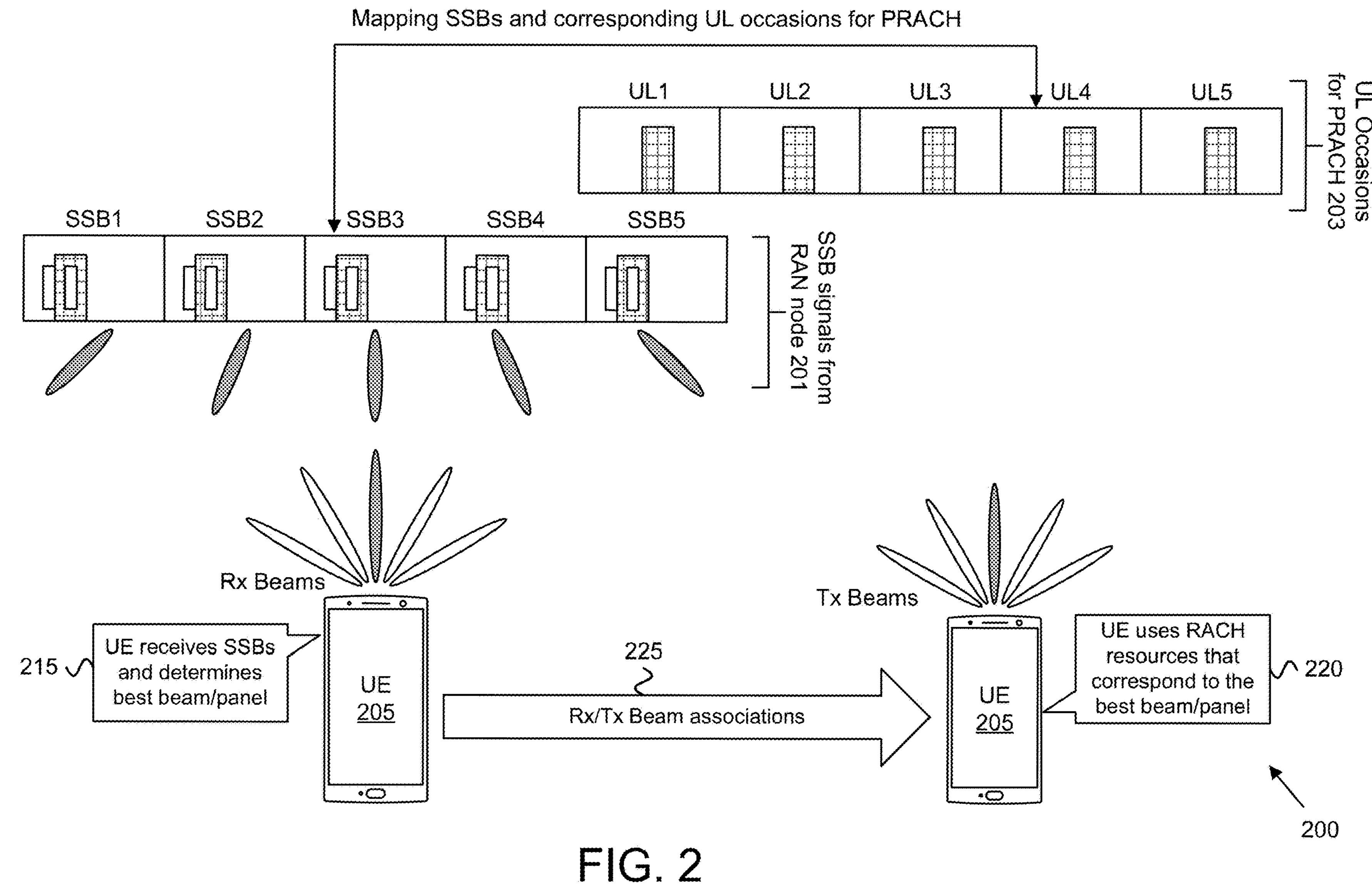
FIG. 2 is a diagram illustrating one embodiment of initial access and beam management.

FIG. 2 depicts a scenario 200 for initial access and beam management, in accordance with aspects of the present disclosure. The scenario 200 involves a UE 205 that maps SSB signals 201 and corresponding UL occasions 203 for PRACH. The UE 205 receives SSB signals 201 (transmitted by a RAN node) via one or more Rx beams (see step 215). Once the UE 205 has detected the cell from the strongest SS Block, it needs to use RACH resources that correspond to the best beam direction toward the UE 205 (see step 220). Thus, the UE 205 establishes beam associations (see step 225). Otherwise, the RAN node may not receive the UE 205 correctly and will not use the right beam direction in the downlink for the PRACH response. Compared to LTE, the UE 205 needs to select correct resources in time, frequency, and additionally in the spatial domain.

According to the first solution, the UE 205 is configured to use multiple beam(s)/panel(s) for PRACH preamble transmission, associating preamble transmission from multiple beams and/or panels to the same UE and signaling to the base station these beam(s)/panel(s), either implicitly via preamble ID or explicitly via MsgA PUSCH.

According to the first solution, a RAN node (e.g., gNB/eNB) enables the UE 205 to use multiple preamble transmissions via RRC RACH configuration. The RAN node configures in-coverage UEs to use multiple preambles using multiple Tx beam(s)/panel(s) by increasing the number of the possible preambles a UE can generate, and group them with Tx beam/panel and associating the preamble transmission from plurality of beams and/or panels to the UE 205.

FIG. 3 depicts a table 300 for random-access configurations, according to embodiments of the first solution. In one implementation of the first solution, the RAN node may indicate in RRC RACH configuration message to the UE 205 in its coverage to use a set of RACH configuration indices, each RACH configuration index being associated with a UE Tx beam/panel index. As an example, the RAN node may indicate in RRC RACH configuration message to the UE 205 in its coverage to use a set of RACH configuration indices by assigning multiple PRACH subframes/slots for RACH resources.

As depicted, in subframe 4, all UEs may select their random preambles and transmit using panel #0, while in subframe 9, all UEs use panel #1, and in subframe 8, all UEs transmit using panel #2. In another example, the UEs are configured to use different RACH resources in frequency for each beam/panel.

FIG. 4 depicts a table 400 for explicit indication of panels that can be used by UEs for PRACH preamble transmission, according to embodiments of the first solution. As discussed above, a RAN node (e.g., gNB/eNB) enables the UE 205 to use multiple preamble transmissions via RRC RACH configuration. The RAN node configures in-coverage UEs to use multiple preambles using multiple Tx beam(s)/panel(s) by increasing the number of the possible preambles a UE can generate, and group them with Tx beam/panel and associating the preamble transmission from plurality of beams and/or panels to the UE 205.

In another implementation of the first solution, the random access configurations table for FR2 is enhanced or a new table is added, where an additional column is added to explicitly indicate the panels to be used for transmission of preambles. Correspondingly, the column with the subframe/slot number is enhanced to group the subframes/slots such as the number of groups are mapped one-to-one to the panels as shown in index #0 of FIG. 4, such that slot numbers {4, 9} correspond to Panel ID 0, slot numbers {14, 19} correspond to Panel ID 1, and so on.

For index #1, when the number of indicated Panel ID is just one, but the slot numbers are grouped into more than one group, then it would correspond to the transmission from different beams of the same panel. So, for PRACH Configuration Index #1 in FIG. 4, there is only one Panel ID ("0"), with 2 groups of slot numbers: {3, 7, 11, 15, 19} and {23, 27, 31, 35, 39}. Other combinations or numbers are also possible, as the depicted details are exemplary. If no Panel ID is indicated for a given index, e.g., as for PRACH Configuration Indices 2-6, then conventional preamble transmission is followed.

Depending on it is own implementation, the UE 205 may map the configured logical panels to different number of physical panels. As an example, a UE 205 supported with two physical panels may map more than two logical panels in different slots. In this example, the UE 205 may use physical panel 0 to transmit PRACH preambles associated with logical panel 0 and 3 on slots {9, 4} and {24, 29}, physical panel 1 to logical panel 2 and 4 in the slots {14, 19} and {34, 39}.

Figure 5:
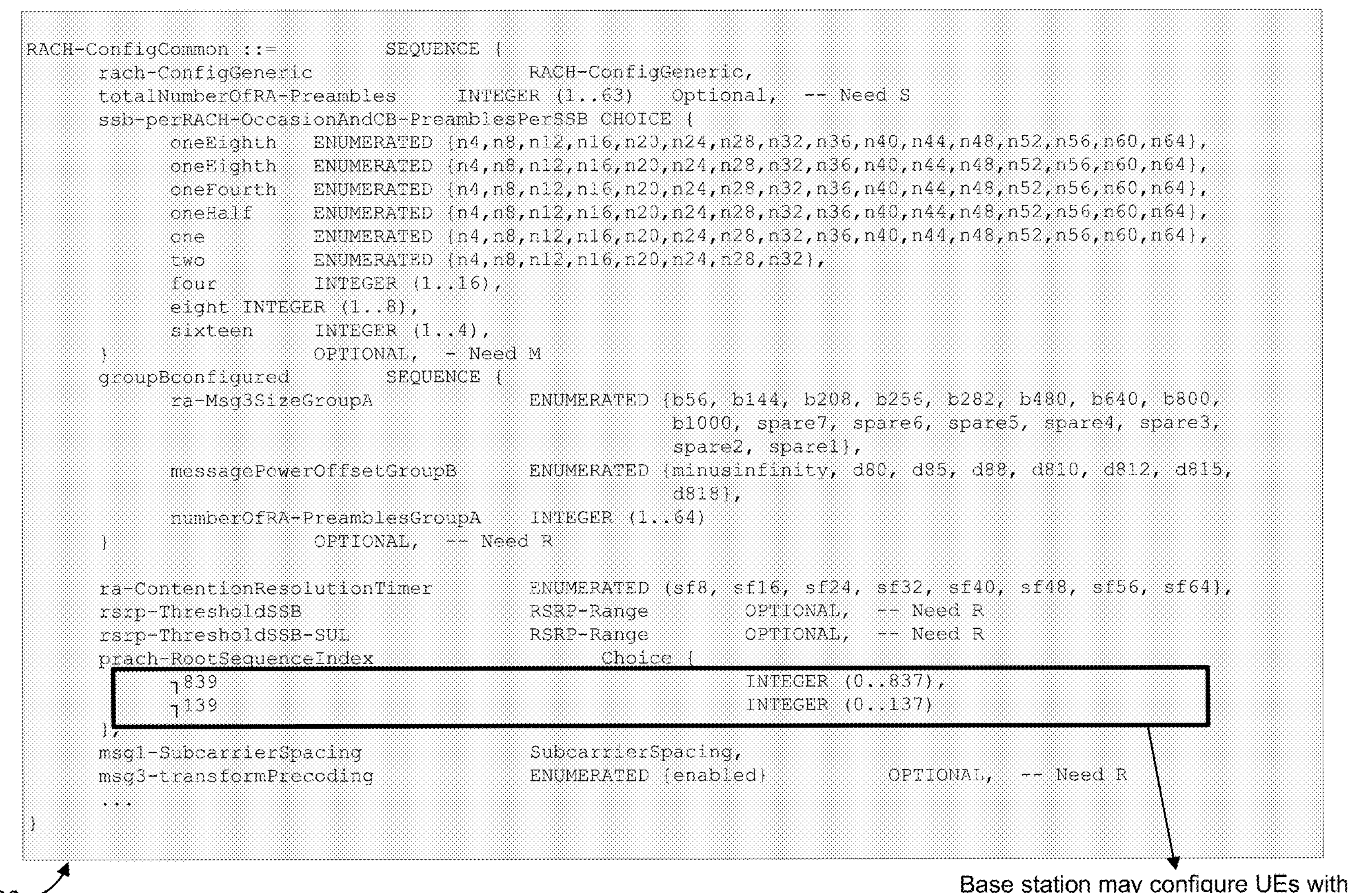
FIG. 5 is a diagram illustrating one embodiment of a RRC RACH configuration message.

FIG. 5 depicts a RRC RACH configuration message 500, according to embodiments of the first solution. As discussed above, a RAN node (e.g., gNB/eNB) enables the UE 205 to use multiple preamble transmissions via RRC RACH configuration. The RAN node configures in-coverage UEs to use multiple preambles using multiple Tx beam(s)/panel(s) by increasing the number of the possible preambles a UE 205 can generate, and group them with Tx beam/panel and associating the preamble transmission from plurality of beams and/or panels to the UE 205.

In one implementation of the first solution, the RAN node may configure the UE 205 with multiple prach-RootSequenceIndex or multiple msgA-prach-RootSequenceIndex in SIB, each associated with a certain UE Tx beam/panel index. Based on the UE capability in terms of number of available panels, the power condition, and/or the detected SSBs, the UE 205 may select all or subset of the configured rootSequences or RACH configuration indices for PRACH preambles generation. For the RAN node to determine that the received PRACH preambles belong to the same UE 205, while generating the random preambles the UE 205 uses the same cyclic shift for each rootSequence. The PRACH preambles generated from each rootSequence are orthogonal, but orthogonality of preambles generated from different rootSequences cannot be guaranteed.

Figure 6:
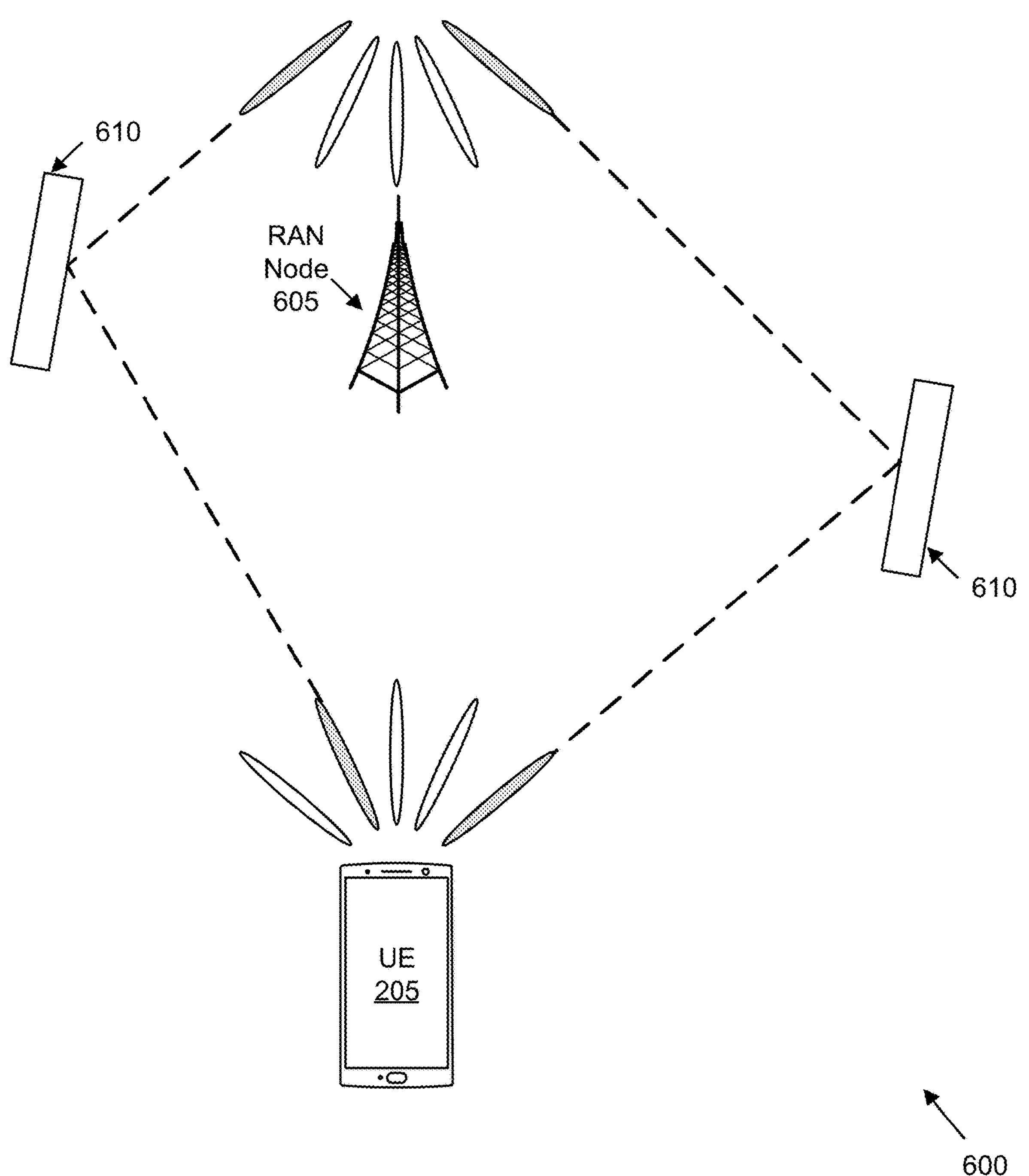
FIG. 6 is a diagram illustrating one embodiment of multiple beam/panel preamble transmission and reception.

FIG. 6 depicts a scenario 600 of multiple beam/panel preamble transmission and reception, according to embodiments of the first solution. The UE 205 transmits the preambles toward a RAN node 605 using multiple beams. Due to radio frequency reflection in the environment 610, multiple beams may be received at the RAN node 605.

As noted above, the PRACH preambles generated from each rootSequence are orthogonal, but orthogonality of preambles generated from different rootSequences cannot be guaranteed. However, as shown in FIG. 6, the directional transmission and reception of these preambles by/from different panels help the RAN node 605 to resolve them. As discussed above, the UE 205 uses the same cyclic shift for each rootSequence while generating the random preambles, so that the RAN node 605 can determine that the received PRACH preambles belong to the same UE 205.

According to the second solution, for Type-1 random access (four-step RACH), UE transmits multiple PRACH preambles using multiple beam(s)/panel(s). The UE 205 lists (i.e., internally selects) the best N beams, to be associated with the potential preamble beams, based on a predefined threshold of the detected SSBs RSRP. Once the UE receives RRC configuration for the possible M beams for PRACH it chooses L preamble beams, where $L \leq \min(N, M)$.

Figure 7A:
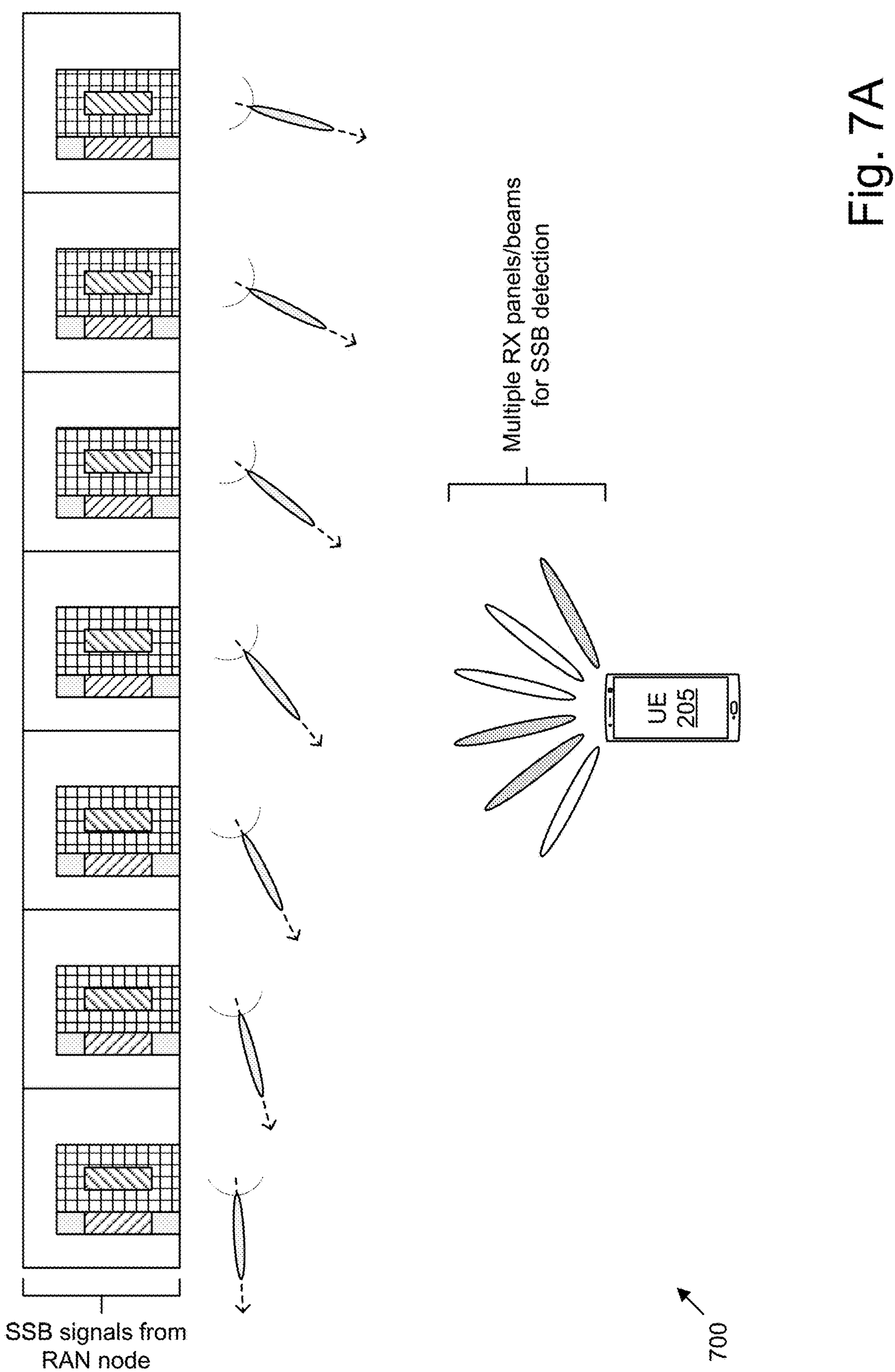
FIG. 7A is a diagram illustrating one embodiment of SSB detection using multiple beams/panels.

FIG. 7A depicts a scenario 700 of SSB detection using multiple beams/panels, according to embodiments of the second solution. Upon detecting SSB signals from Rx beam(s)/panel(s), the UE 205 determines the candidate UL Tx beam(s)/panel(s) associated with the strongest SSB beam(s). As depicted in the scenario 700, the UE 205 searches for SSB on the available Rx beam(s)/panel(s) and lists (i.e., internally selects) the best Rx beam(s)/panel(s) based on a specified threshold.

Figure 7B:
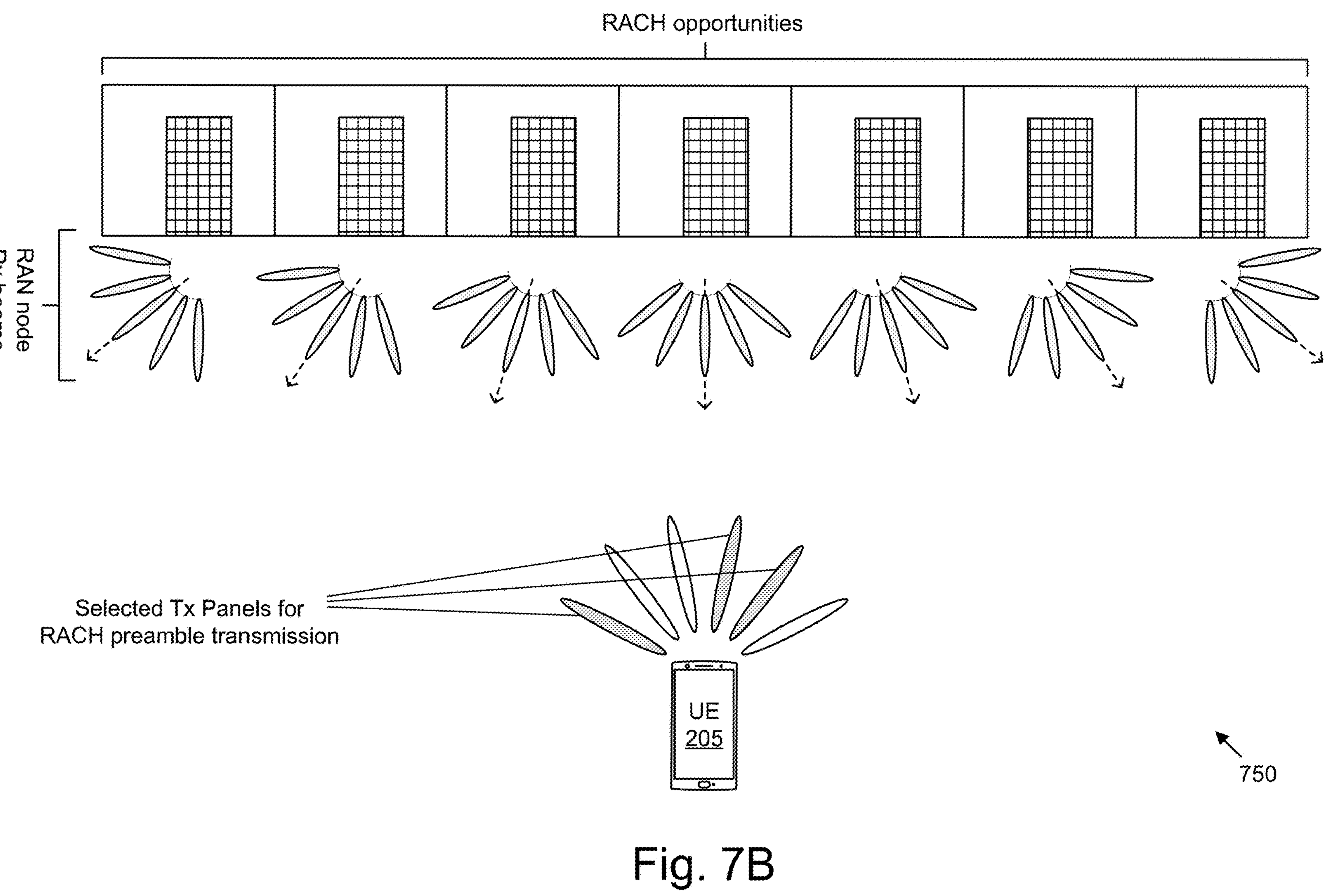
FIG. 7B is a diagram illustrating one embodiment of initial selection of Tx beam(s)/panel(s) associated with Rx beam(s)/panel(s) detection.

FIG. 7B depicts a scenario 750 of initial selection of Tx beam(s)/panel(s) associated with Rx beam(s)/panel(s) detection, according to embodiments of the second solution. As depicted in the scenario 750, the UE 205 generates one or more PRACH preambles based on its capability, power status, and MPE condition, etc. Each PRACH preamble is associated with a beam/panel ID using the corresponding rootSequence index or RACH configuration index and simultaneously transmits them or in a time domain manner by one or more beam(s)/panel(s) as depicted in FIG. 7B. The RAN node 605 receives these multiple preambles using single or multiple beam(s)/panel(s), and determines the best UL beam(s)/panel(s) a UE can use which are associated with the preamble ID. As a response to the RACH preamble, the RAN node 605 indicates to the UE 205 (e.g., in RAR/Msg2) the P UL panel(s)/beam(s), where $P \leq L$, in Msg3 or beyond in any of the DL messages and the UE 205 may use the set of panels for transmitting any of the UL messages from Msg3 and beyond.

Figure 8:
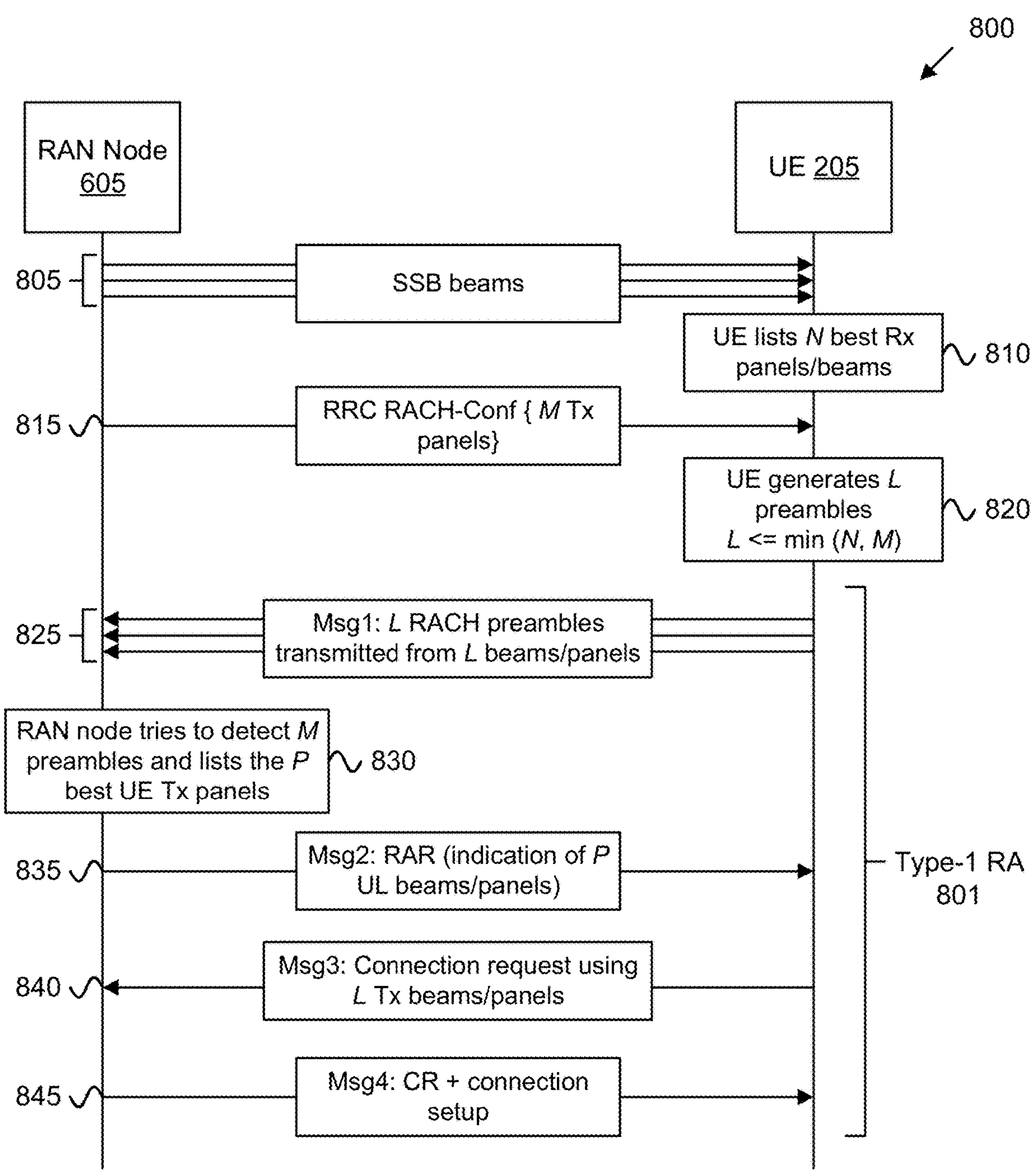
FIG. 8 is a diagram illustrating one embodiment of Type-1 random-access procedure for beam(s)/panel(s) implicit indication.

FIG. 8 depicts a scenario 800 of indicating beam correspondence using a Type-1 random-access procedure 801, according to embodiments of the second solution. Here, the scenario 800 shows implicit beam(s)/panel(s) indication using preamble ID procedure. In the RAR message, as a response to the UE PRACH transmission, the RAN node 605 indicates to UE 205 the UL Tx beam(s)/panel(s) to be used for Msg3 and beyond. The RAN node 605 transmits a plurality of SSB signals using a plurality of beams (see signaling 805). The UE 205 receives the SSB signal using multiple Rx beams/panels and lists (i.e., internally selects) the N Rx beam(s)/panel(s) with the strongest SSB detection (see block 810).

The UE 205 is configured by the RAN node 605 with M possible beams/panels that can be used for PRACH transmission (see messaging 815). The UE 205 selects Z beam (s)/panel(s) that satisfy a certain threshold for PRACH transmission and generates L RACH preambles (see block 820). Here, L≤min(M, N) depends on the UE capability of supporting multiple panels and the power status of the UE 205.

As the first step of the Type-1 RA (i.e., 4-step RACH) procedure 801, the UE 205 transmits L RACH preambles from L beam(s)/panel(s) (see signaling 825). The RAN node 605 tries to detect M preambles and lists (i.e., internally selects) the P best UE Tx panels (see block 830). According to another embodiment, for Type-1 RA procedure 801, the UE 205 transmits a plurality of UL messages using plurality of beams and/or panels. As the second step of the Type-1 RA procedure 801, the RAN node 605 transmits a Msg2 RAR containing an indication of the P best UL beam(s)/panel(s) (see messaging 835).

As the third step of the Type-1 RA procedure 801, the UE 205 transmits a Msg3 contention request message using L Tx beam(s)/panel(s) (see messaging 840). According to one embodiment, the UE 205 may repeatedly transmit Msg3 (or any of the UL message during initial access before or after the contention resolution steps) using plurality of beams and/or panels in time-domain manner. In one embodiment, the panel ID and/or beam ID may be explicitly indicated in the CCCH, MAC CE or L1 signaling along with the UE ID. Here, the Panel/beam ID for each repetition is carried by Msg3's and the Panel ID is either included as part of the extension of corresponding CCCH message, e.g., extended UE ID. Alternatively, the Panel/beam ID may be included using a new MAC CE with reserved LCID or even by just using a new reserved LCID for carrying the CCCH PDU in which case LCIDs are reserved sequentially for Panel Id#. As an example, LCID_X+0 may be used to signal Panel_id 0, LCID_X+1 may be used to signal Panel_id 1 and so on.

As the fourth step of the Type-1 RA procedure 801, the RAN node 605 transmits a Msg4 contention resolution and connection setup message (see messaging 845). The RAN node 605 determines the panel ID by decoding the Msg3. For the successfully decoded Msg3, the RAN node 605 may list the panel IDs and configure the UE 205 via Msg4 with the suitable Tx panel(s)/beam(s) to be used for the following (i.e., subsequent) UL transmissions. Note that the UL message may be swept from plurality of beams and/or panels and the set of UL beams/or panels will then be transmitted from RAN node 605 to UE 205 in any of the DL messages during the initial access.

Figure 9:
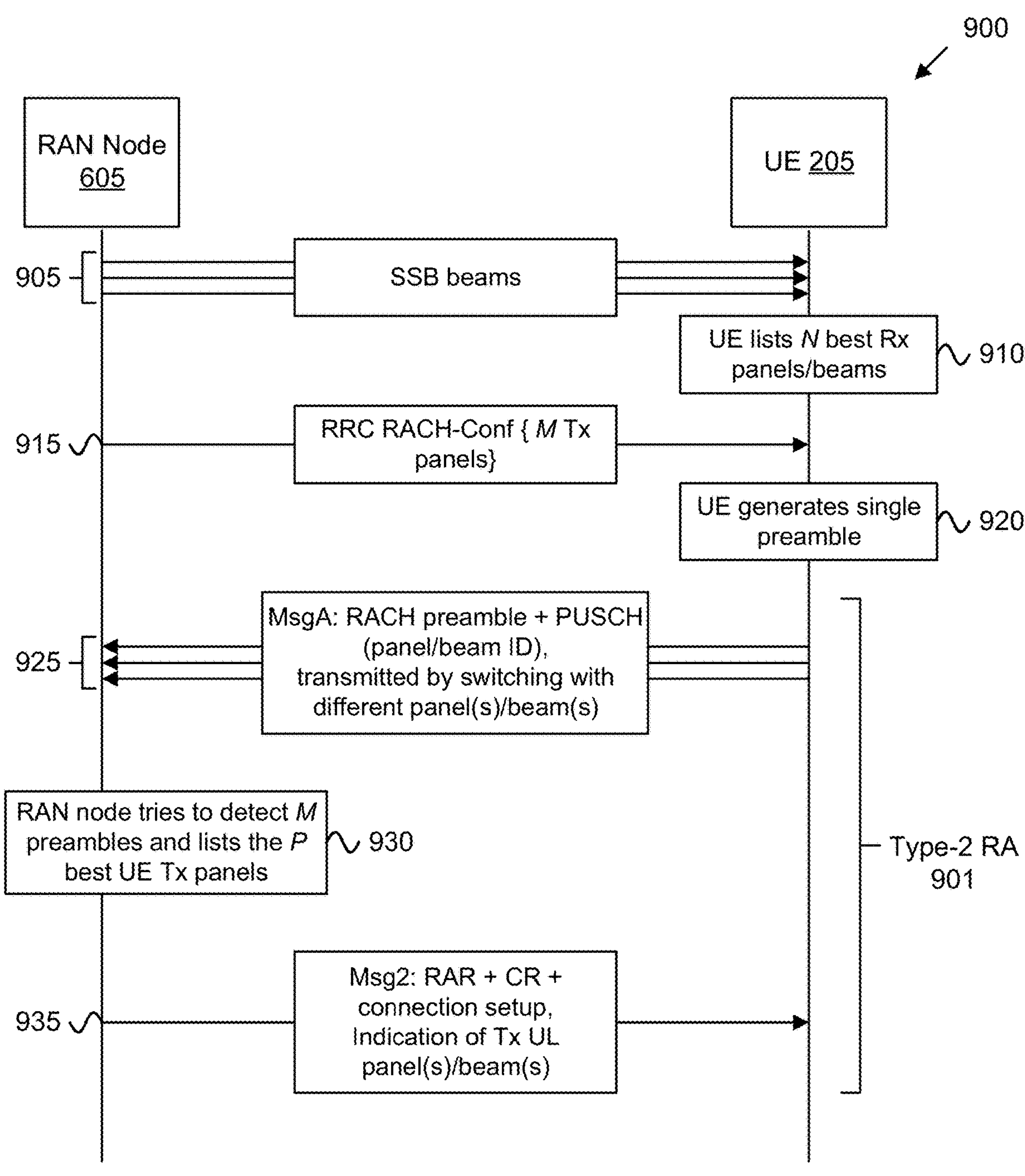
FIG. 9 is a diagram illustrating one embodiment of Type-2 random-access procedure with explicit indication of UL beam/panel using MsgA PUSCH.

FIG. 9 depicts a scenario 900 of indicating beam correspondence using a Type-2 random-access procedure 901, according to embodiments of the third solution. Here, the scenario 900 shows explicit indication of UL beam/panel using MsgA PUSCH. Upon detecting SSB signals from Rx beam(s)/panel(s), the UE 205 determines the possible UL Tx beam(s)/panel(s) associated with the strongest SSB beam(s) detected from Rx beam(s)/panel(s).

The RAN node 605 transmits a plurality of SSB signals using a plurality of beams (see signaling 905). The UE 205 receives the SSB signal using multiple Rx beams/panels and lists (i.e., internally selects) the N Rx beam(s)/panel(s) with the strongest SSB detection (see block 910).

The UE 205 is configured by the RAN node 605 with M possible beams/panels that can be used for PRACH transmission (see messaging 915). The UE 205 generates a single PRACH preamble, e.g., based on RRC RACH configuration (see block 920).

As the first step of the Type-2 RA (2-step RACH) procedure 901, the UE 205 performs multiple transmissions of MsgA (containing the single PRACH preamble accompanied by a PUSCH transmission) by switching between beams/panels for the preamble transmission on the configured RACH opportunities (see signaling 925). Beam/panel ID for each repetition is carried by MsgA's PUSCH.

In an alternate implementation of the Type-2 RA procedure 901, during MsgA transmission the UE 205 sends multiple preambles with multiple PUSCH resources. Here, each preamble caries its corresponding beam/panel index. In a second alternate implementation of the Type-2 RA procedure 901, during MsgA transmission the UE 205 sends multiple MsgA PUSCH from multiple beam(s)/panel(s), where the beam/panel index is associated with the corresponding DMRS sequence used for PUSCH.

The RAN node 605 tries to detect M preamble repetitions and determines the panel ID by decoding the MsgA PUSCH for each PRACH occasion (see block 930). For the successfully decoded PRACH preamble repetitions, the RAN node 605 lists the panel IDs.

As the second step of the Type-2 RA procedure 901, the RAN node 605 transmits a MsgB combining RAR, contention resolution, and connection setup messages (see messaging 935). The RAN node 605 configures the UE 205 via MsgB with the suitable Tx beam(s)/panel(s) to be used for the following (i.e., next) UL transmissions.

In another alternate implementation of the Type-2 RA procedure 901, the beam/panel ID for each repetition is carried by MsgA's PUSCH and the Panel ID is either included as part of the extension of corresponding CCCH message, e.g., extended UE Id, or included using a new MAC CE with reserved LCID or even by just using a new reserved LCID for carrying the CCCH PDU in which case LCIDs are reserved sequentially for Panel Id #. As an example of the last one, LCID_X+0 is used to signal Panel_id 0, LCID_X+1 is used to signal Panel_id 1 and so on. Here, the RAN node 605 determines the panel ID by decoding the MsgA PUSCH for each PRACH occasion. For the successfully decoded PRACH preamble repetitions, the RAN node 605 lists the panel IDs and configures the UE 205 via MsgB with the suitable Tx beam(s)/panel(s) to be used for the following (i.e., subsequent) UL transmissions.

According to the fourth solution, for both Type-1 and Type-2 random access (two/four-step RACH), the UE 205 switches to different beam(s)/panel(s). If the initial RACH trial was not successful (i.e., the UE 205 did not receive the RAR message—a response for the PRACH preamble—during a configured time window), then the UE 205 retransmits the preamble(s) using different beam(s)/panel(s).

In one example, if the UE 205 does not receive the RAR message within the configured time period using the first beam and/or panel, then the preamble is re-transmitted using another beam and/or panel. If the UE 205 fails to receive the RAR during the configured period, the first step is repeated using different set of panels and/or beams. If RAR detection still failing, the first step is repeated again with different set of panels and/or beams by ramping up the transmit power of the UE 205.

In another example, if the UE 205 does not receive the RAR message within the configured period using the first beam and/or panel, then the preamble is re-transmitted and steps are repeated using another beam and/or panel along with power ramp-up procedure.

From above embodiment on Type-2 RA procedure, if the UE performs Type-2 RA procedure and in one case where the preamble is successfully decoded by the RAN node 605 but the MsgA PUSCH is failed to be decoded by the RAN node 605 then in this example, RAN node 605 may indicate in the RAR to repeat MsgA with the same preamble using different set of beams and/or panels, where the MsgA contains panel/beam ID, and in another example, the RAR message could indicate the Msg3 transmission using another set of panels and/or beams.

According to the fifth solution, the RAN node 605 immediately indicates the first decoded preamble associated with a Tx beam/panel. If the UE 205 is configured to switch beam(s)/panel(s) for different PRACH subframes/slots, the RAN node 605 upon decoding the first preamble from the UE 205 may immediately send RAR message indicating the first Tx beam/panel to be used. For later decoded PRACH preambles, an update/refining of the selected beam(s)/panel (s) is sent by the following (i.e., next) DL PDCCHs upon decoding other preambles.

Figure 10:
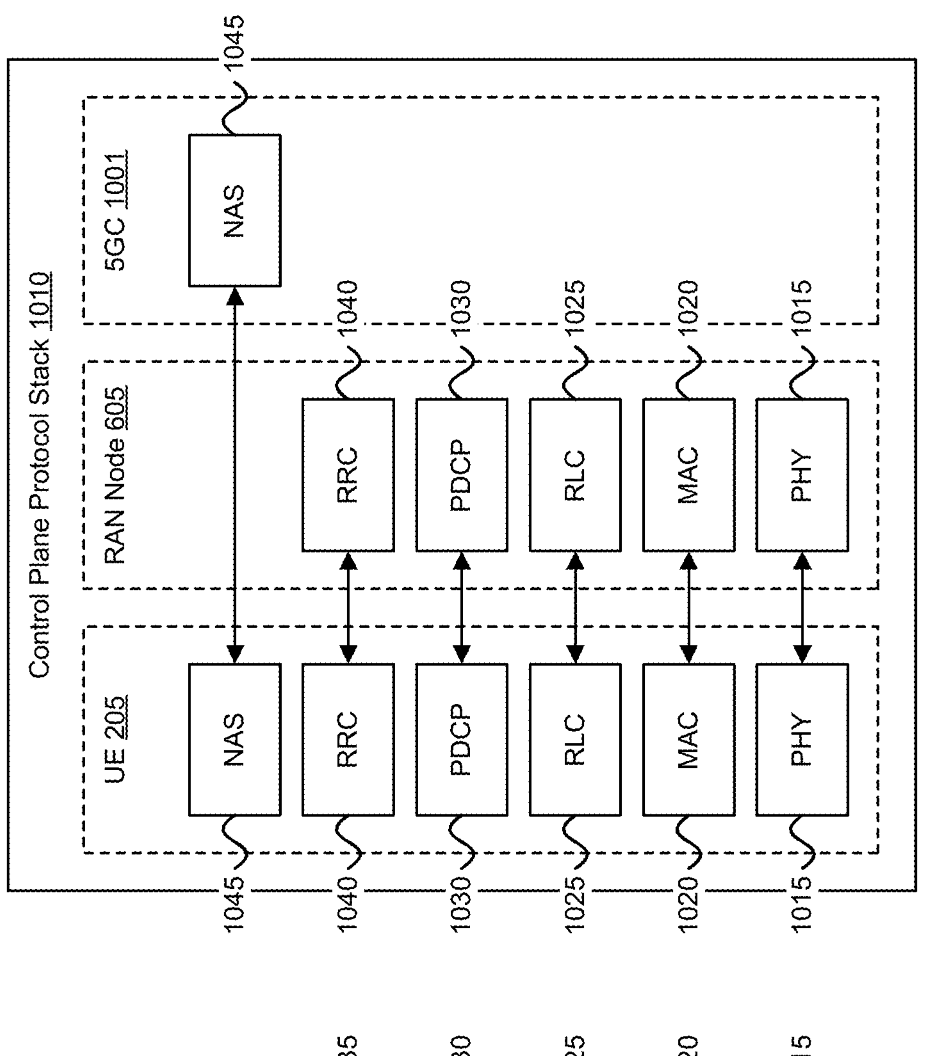
FIG. 10 is a block diagram illustrating one embodiment of a NR protocol stack.
Figure 10:
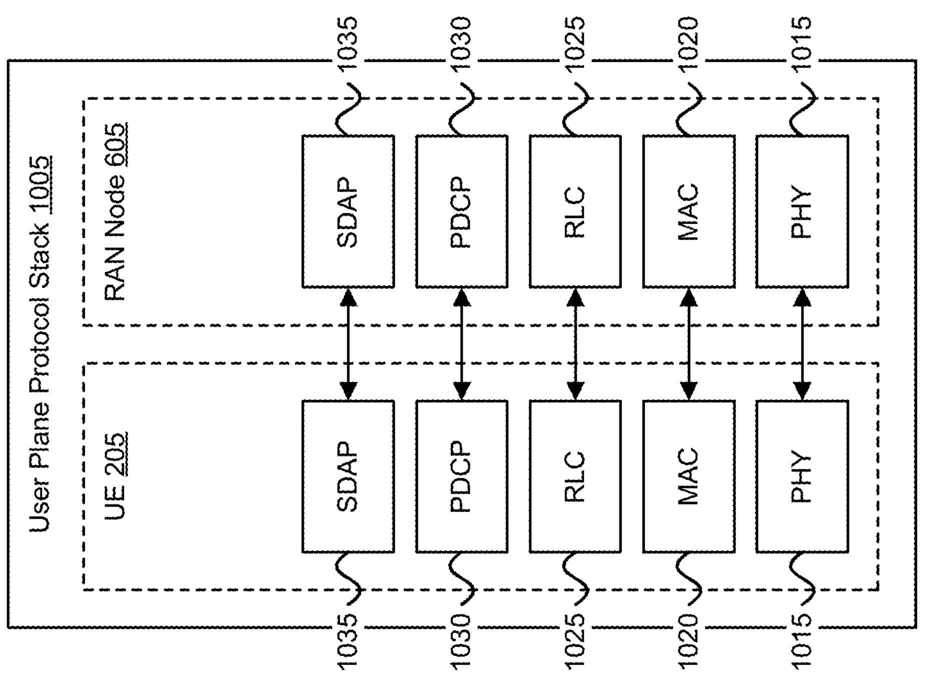

FIG. 10 depicts a NR protocol stack 1000, in accordance with aspects of the present disclosure. While FIG. 10 shows a UE 205, a RAN node 605 and the 5G core network ("5GC") 1001, these are representative of a set of remote units 105 interacting with a base unit 121 and a mobile core network 140. As depicted, the protocol stack 1000 comprises a User Plane protocol stack 1005 and a Control Plane protocol stack 1010. The User Plane protocol stack 1005 includes a physical ("PHY") layer 1015, a Medium Access Control ("MAC") sublayer 1020, the Radio Link Control ("RLC") sublayer 1025, a Packet Data Convergence Protocol ("PDCP") sublayer 1030, and Service Data Adaptation Protocol ("SDAP") layer 1035. The Control Plane protocol stack 1010 includes a physical layer 1015, a MAC sublayer 1020, a RLC sublayer 1025, and a PDCP sublayer 1030. The Control Place protocol stack 1010 also includes a Radio Resource Control ("RRC") layer 1040 and a Non-Access Stratum ("NAS") layer 1045.

The AS layer (also referred to as "AS protocol stack") for the User Plane protocol stack 1005 consists of at least SDAP, PDCP, RLC and MAC sublayers, and the physical layer. The AS layer for the Control Plane protocol stack 1010 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 1040 and the NAS layer 1045 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers."

The physical layer 1015 offers transport channels to the MAC sublayer 1020. The MAC sublayer 1020 offers logical channels to the RLC sublayer 1025. The RLC sublayer 1025 offers RLC channels to the PDCP sublayer 1030. The PDCP sublayer 1030 offers radio bearers to the SDAP sublayer 1035 and/or RRC layer 1040. The SDAP sublayer 1035 offers QoS flows to the core network (e.g., 5GC 1001). The RRC layer 1040 provides for the addition, modification, and release of Carrier Aggregation and/or Dual Connectivity. The RRC layer 1040 also manages the establishment, configuration, maintenance, and release of Signaling Radio Bearers ("SRBs") and Data Radio Bearers ("DRBs"). The NAS layer 1045 is used to convey non-radio signaling between the UE 205 and, e.g., an AMF in the 5GC 1001 (or a MME for an LTE/EPS scenario).

Figure 11:
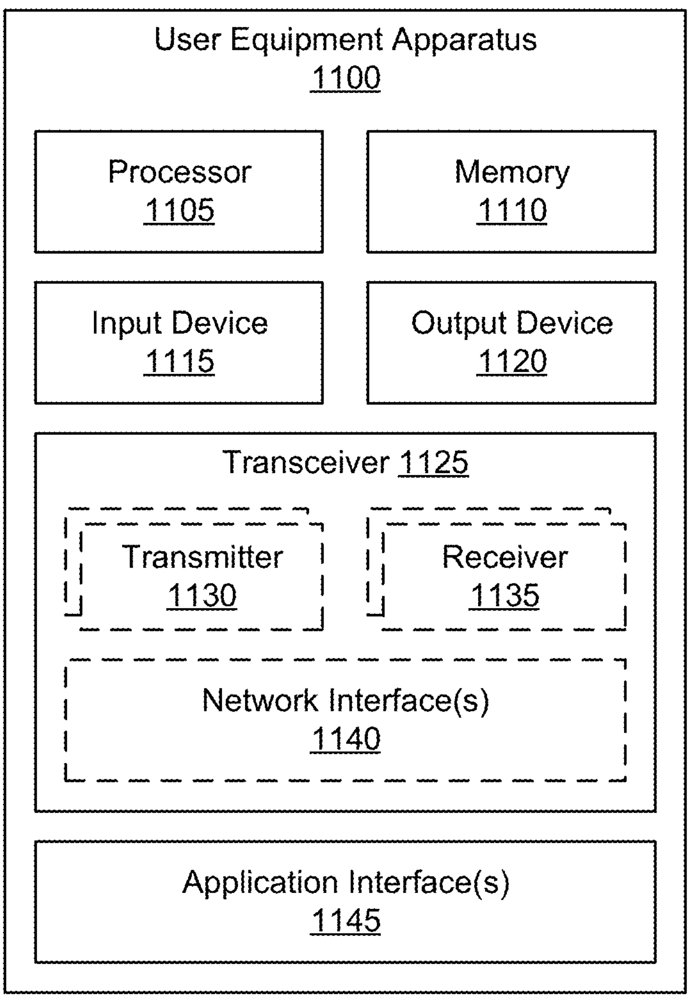
FIG. 11 is a diagram illustrating one embodiment of a user equipment apparatus.

FIG. 11 depicts a user equipment apparatus 1100 that may be used for handling autonomous retransmission, in accordance with aspects of the present disclosure. In various embodiments, the user equipment apparatus 1100 is used to implement one or more of the solutions described above. The user equipment apparatus 1100 may be one embodiment of the remote unit 105 and/or the UE 205, described above. Furthermore, the user equipment apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the user equipment apparatus 1100 may not include any input device 1115 and/or output device 1120. In various embodiments, the user equipment apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. Here, the transceiver 1125 communicates with one or more cells supported by one or more base units 121. Additionally, the transceiver 1125 may support at least one network interface 1140 and/or application interface 1145. The application interface(s) 1145 may support one or more APIs. The network interface(s) 1140 may support 3GPP reference points, such as Uu and N1. Other network interfaces 1140 may be supported, as understood by one of ordinary skill in the art.

Moreover, the transceiver 1125 may include a plurality of UE panels associated with one or more beams (not shown). A "UE panel" may be a logical entity with physical UE antennas mapped to the logical entity. How to map physical UE antennas to the logical entity may be up to UE implementation. Depending on UE's own implementation, a "UE panel" can have at least one of the following functionalities as an operational role of Unit of antenna group to control its Tx beam independently, Unit of antenna group to control its transmission power independently, Unit of antenna group to control its transmission timing independently. The "UE panel" may be transparent to gNB. For certain condition(s), gNB or network can assume the mapping between UE's physical antennas to the logical entity "UE panel" may not be changed. For example, the condition may include until the next update or report from UE or comprise a duration of time over which the gNB assumes there will be no change to the mapping.

The processor 1105, in one embodiment, may include any known controller capable of executing computer-readable instructions and/or capable of performing logical operations. For example, the processor 1105 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125.

In various embodiments, the processor 1105 controls the user equipment apparatus 1100 to implement the above described UE behaviors. For example, via the transceiver 1125, the processor 1105 receiving a plurality of SSBs on at least two UE panels. The processor 1105 determines a corresponding set of UE panels from the SSBs and sends, via the transceiver 1125, an indication of the corresponding set of UE panels to a RAN node using a random-access procedure. Note that while the first apparatus is described in terms of receiving on "UE panels" and identifying a "set of UE panels," in other embodiments the first SSB may be received via at least two beams, where a "set of beams" is then determined. As used herein, the term "beam/panel" (or similar notation) indicates that the description applies to a beam and/or UE panel.

In some embodiments, the processor 1105 controls the transceiver 1125 to transmit a first RACH preamble as part of the random-access procedure, the first preamble being transmitted using a first associated beam/panel, and transmitting a second RACH preamble using a second associated beam/panel if no response to the first preamble is received from the RAN node. In certain embodiments, the indication of the corresponding set of beams/panels comprises multiple transmissions of RACH preamble from at least one UL beam/panel, the RACH preamble comprising a sequence, where different parameters corresponding to beam/panel IDs are used for generating the sequence.

In some embodiments, the processor 1105 receives (e.g., via the transceiver 1125) a RRC configuration from the RAN node and stores a RRC random-access configuration table. In such embodiments, the processor 1105 also adds a new column for parameters associated with beam/panel IDs in the RRC random-access configuration table. In such embodiments, the modified RRC random-access configuration table may correlate a beam/panel ID to one or more of: a PRACH configuration index, a subframe number, and a slot number.

In some embodiments, the processor 1105 transmits (e.g., via the transceiver 1125) multiple PRACH preambles from at least one UL beam/panel, where different configuration for each preamble is used to indicate the beam/panel ID. In such embodiments, the processor 1105 may also receive (e.g., via the transceiver 1125) a configuration parameter from the RAN node, said configuration parameter indicating M root sequences for generating the PRACH preambles, each root sequence being associated with a Tx beam/panel index. In one embodiment, the RAN node configures the user equipment apparatus 1100 with M prach-RootSequenceIndexes in SIB (i.e., for a 4-step RACH procedure). In another embodiment, the RAN node configures the user equipment apparatus 1100 with M msgA-prach-RootSequenceIndexes in SIB (i.e., for a 2-step RACH procedure).

In some embodiments, the processor 1105 generates L PRACH preambles using L UL beams/panels and transmitting the L PRACH preambles to the RAN node, L being a positive integer. In certain embodiments, L≤min(N, M), where N represents the number of best beams/panels based on detecting the multiple SSB blocks, and where M represents a number of candidate beams/panels configured by the RAN node.

In some embodiments, the random-access procedure is a 4-step RACH procedure. In such embodiments, the processor 1105 transmits (e.g., via the transceiver 1125) L PRACH preambles in Msg1 using L beams/panels, where the used UL beams/panels of Msg1 is implicitly indicated based on the preamble ID. In certain embodiments, the processor 1105 may also receive (e.g., via the transceiver 1125) a second indication from the RAN node in a Msg2 for the P detected preambles each associated with a Tx beam/panel to be used for the following UL transmission, where P and L are positive integers with P≤L, the Msg2 being a random-access response message of the 4-step random-access procedure.

In some embodiments, the random-access procedure is a 2-step RACH procedure. In such embodiments, the processor 1105 transmits (e.g., via the transceiver 1125) L PRACH preambles in MsgA using L beams/panels, the MsgA being a first message of the 2-step random-access procedure and being accompanied by a PUSCH transmission, wherein the used UL beams/panels of MsgA is implicitly indicated based on one of: the preamble ID and a DMRS sequence of MsgA PUSCH, or explicitly using MsgA PUSCH payload. In certain embodiments, the processor 1105 may also receive (e.g., via the transceiver 1125) a second indication from the RAN node in a MsgB for the P detected preambles IDs each associated with a Tx beam/panel to be used for the following UL transmission, where P &L, the MsgB being a random-access response message of the 2-step random-access procedure.

In some embodiments, the processor 1105 receives (e.g., via the transceiver 1125) a configuration parameter from the RAN node. Here, the configuration parameter indicates M RACH configuration indices each associated with a Tx beam/panel index, where M is a positive integer. In some embodiments, the processor 1105 lists (i.e., selects) the best N beams/panels based on detecting the multiple SSB blocks, where N is a positive integer. In one embodiment, the processor 1105 selects the best N beams, to be associated with the potential preamble beams, based on a predefined threshold of the detected SSBs RSRP. Once the processor 1105 receives RRC configuration for the possible M beams for PRACH, it chooses L preamble beams, as described above, where L≤min(N,M).

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to handling autonomous retransmission. For example, the memory 1110 may store MAC PDUs, BWP configuration, UL resource configurations, CG configurations, and the like. In certain embodiments, the memory 1110 also stores program code and related data, such as an operating system or other controller algorithms operating on the apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, an LCD display, an LED display, an OLED display, a projector, or similar display device capable of outputting images, text, or the like to a user. As another, non-limiting, example, the output device 1120 may include a wearable display separate from, but communicatively coupled to, the rest of the user equipment apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 includes at least transmitter 1130 and at least one receiver 1135. One or more transmitters 1130 may be used to provide UL communication signals to a base unit 121, such as the UL transmissions described herein. Similarly, one or more receivers 1135 may be used to receive DL communication signals from the base unit 121, as described herein. Although only one transmitter 1130 and one receiver 1135 are illustrated, the user equipment apparatus 1100 may have any suitable number of transmitters 1130 and receivers 1135. Further, the transmitter(s) 1130 and the receiver(s) 1135 may be any suitable type of transmitters and receivers. In one embodiment, the transceiver 1125 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1125, transmitters 1130, and receivers 1135 may be implemented as physically separate components that access a shared hardware resource and/or software resource, such as for example, the network interface 1140.

In various embodiments, one or more transmitters 1130 and/or one or more receivers 1135 may be implemented and/or integrated into a single hardware component, such as a multi-transceiver chip, a system-on-a-chip, an ASIC, or other type of hardware component. In certain embodiments, one or more transmitters 1130 and/or one or more receivers 1135 may be implemented and/or integrated into a multi-chip module. In some embodiments, other components such as the network interface 1140 or other hardware components/circuits may be integrated with any number of transmitters 1130 and/or receivers 1135 into a single chip. In such embodiment, the transmitters 1130 and receivers 1135 may be logically configured as a transceiver 1125 that uses one more common control signals or as modular transmitters 1130 and receivers 1135 implemented in the same hardware chip or in a multi-chip module.

Figure 12:
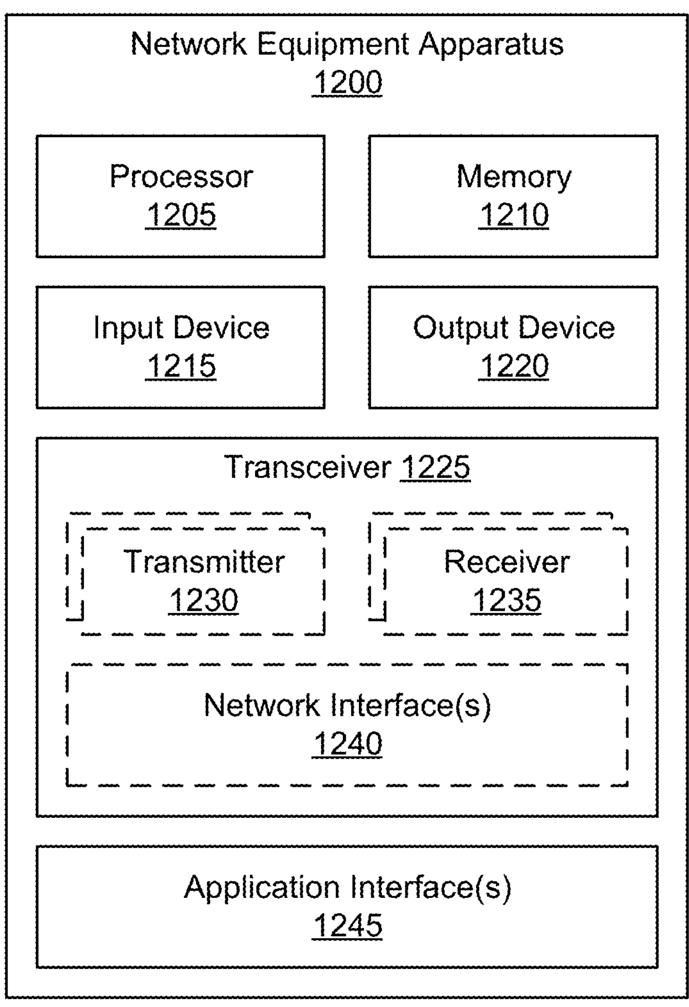
FIG. 12 is a diagram illustrating one embodiment of a network equipment apparatus.

FIG. 12 depicts one embodiment of a network equipment apparatus 1200 that may be used for UL beam/panel selection indication, in accordance with aspects of the present disclosure. In some embodiments, the network apparatus 1200 may be one embodiment of a RAN node and its supporting hardware, such as the base unit 121, RAN node 605 and/or gNB, described above. Furthermore, network equipment apparatus 1200 may include a processor 1205, a memory 1210, an input device 1215, an output device 1220, and a transceiver 1225. In certain embodiments, the network equipment apparatus 1200 does not include any input device 1215 and/or output device 1220.

As depicted, the transceiver 1225 includes at least one transmitter 1230 and at least one receiver 1235. Here, the transceiver 1225 communicates with one or more remote units 105. Additionally, the transceiver 1225 may support at least one network interface 1240 and/or application interface 1245. The application interface(s) 1245 may support one or more APIs. The network interface(s) 1240 may support 3GPP reference points, such as Uu, N1, N2 and N3. Other network interfaces 1240 may be supported, as understood by one of ordinary skill in the art.

The processor 1205, in one embodiment, may include any known controller capable of executing computer-readable instructions and/or capable of performing logical operations. For example, the processor 1205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1205 executes instructions stored in the memory 1210 to perform the methods and routines described herein. The processor 1205 is communicatively coupled to the memory 1210, the input device 1215, the output device 1220, and the transceiver 1225.

In various embodiments, the processor 1205 controls the network equipment apparatus 1200 to implement the above described RAN node behaviors. For example, the processor 1205 may support one or more serving cells that serve a UE. In various embodiments, the transceiver 1225 may transmit a plurality of SSBs on at least two beams. Moreover, the processor 1205 may receive from a UE an indication of a set of UL beams corresponding to the SSBs, as described herein. Moreover, the processor 1205 may perform RACH procedure with a UE, as described herein.

The memory 1210, in one embodiment, is a computer readable storage medium. In some embodiments, the memory 1210 includes volatile computer storage media. For example, the memory 1210 may include a RAM, including dynamic RAM ("DRAM"), synchronous dynamic RAM ("SDRAM"), and/or static RAM ("SRAM"). In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media. In some embodiments, the memory 1210 stores data relating to UL beam/panel selection indication, for example storing UE identities, BFR resource configurations, SR configurations, resource grants, and the like. In certain embodiments, the memory 1210 also stores program code and related data, such as an operating system ("OS") or other controller algorithms operating on the network equipment apparatus 1200 and one or more software applications.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, may include any known electronically controllable display or display device. The output device 1220 may be designed to output visual, audible, and/or haptic signals. In some embodiments, the output device 1220 includes an electronic display capable of outputting visual data to a user. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all or portions of the output device 1220 may be integrated with the input device 1215. For example, the input device 1215 and output device 1220 may form a touchscreen or similar touch-sensitive display. In other embodiments, all or portions of the output device 1220 may be located near the input device 1215.

As discussed above, the transceiver 1225 may communicate with one or more remote units 105 and/or with one or more network functions that provide access to one or more PLMNs. The transceiver 1225 operates under the control of the processor 1205 to transmit messages, data, and other signals and also to receive messages, data, and other signals. For example, the processor 1205 may selectively activate the transceiver (or portions thereof) at particular times in order to send and receive messages.

The transceiver 1225 may include one or more transmitters 1230 and one or more receivers 1235. In certain embodiments, the one or more transmitters 1230 and/or the one or more receivers 1235 may share transceiver hardware and/or circuitry. For example, the one or more transmitters 1230 and/or the one or more receivers 1235 may share antenna(s), antenna tuner(s), amplifier(s), filter(s), oscillator (s), mixer(s), modulator/demodulator(s), power supply, and the like. In one embodiment, the transceiver 1225 implements multiple logical transceivers using different communication protocols or protocol stacks, while using common physical hardware.

Figure 13:
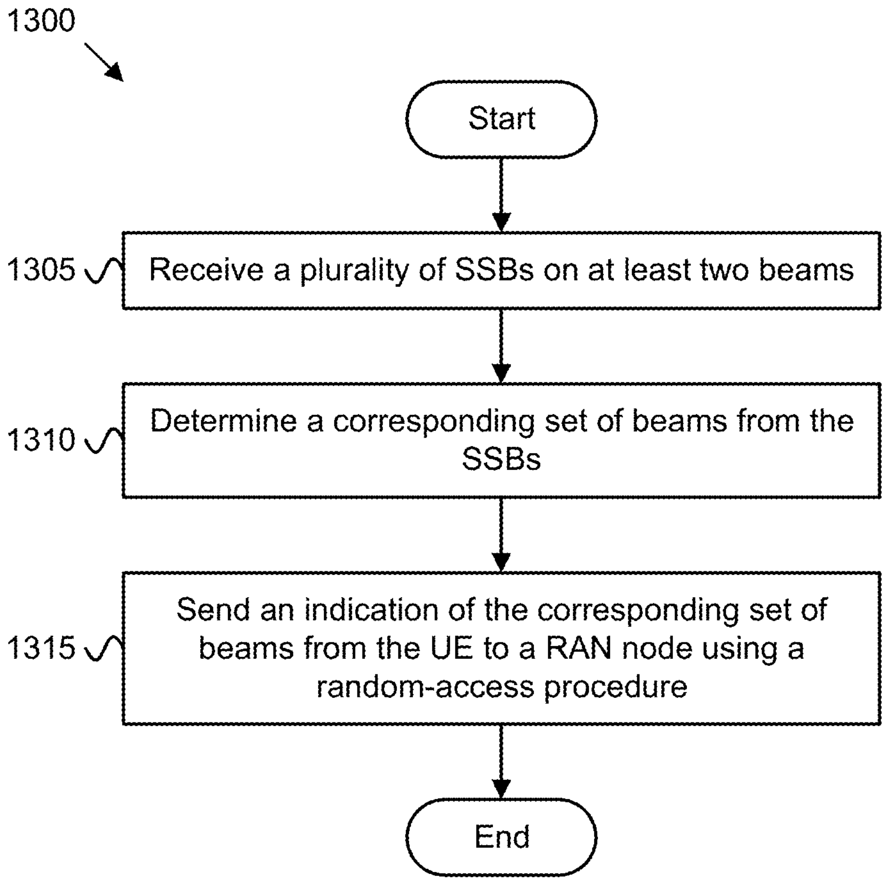
FIG. 13 is a flowchart diagram illustrating another embodiment of a method for UL beam/panel selection indication.

FIG. 13 depicts one embodiment of a method 1300 for UL beam/panel selection indication, in accordance with aspects of the present disclosure. In various embodiments, the method 1300 is performed by a UE, such as the remote unit 105, the UE 205 and/or the user equipment apparatus 1100, described above. In some embodiments, the method 1300 is performed by a processor, such as a microcontroller, a microprocessor, a CPU, a GPU, an auxiliary processing unit, a FPGA, or the like.

The method 1300 begins and receives 1305 a plurality of SSBs on at least two beams. The method 1300 includes determining 1310 a corresponding set of beams from the SSBs. The method 1300 includes sending 1315 an indication of the corresponding set of beams from the UE to a RAN node using a random-access procedure. The method 1300 ends.

Disclosed herein is a first apparatus for UL beam/panel selection indication, in accordance with aspects of the present disclosure. The first apparatus may be implemented by a UE, such as the remote unit 105, the UE 205 and/or the user equipment apparatus 1100, described above. The first apparatus includes a transceiver comprising a plurality of UE panels associated with one or more beams, the transceiver receiving a plurality of SSBs on at least two UE panels. The first apparatus includes a processor that determines a corresponding set of UE panels from the SSBs and sends, via the transceiver, an indication of the corresponding set of UE panels from the first apparatus to a RAN node using a random-access procedure. Note that while the first apparatus is described in terms of receiving on "UE panels" and identifying a "set of UE panels," in other embodiments the first SSB may be received via at least two beams, where a "set of beams" is then determined.

In some embodiments, the processor controls the transceiver to transmit a first RACH preamble as part of the random-access procedure, the first preamble being transmitted using a first associated beam/panel, and transmitting a second RACH preamble using a second associated beam/panel if no response to the first preamble is received from the RAN node. In certain embodiments, the indication of the corresponding set of beams/panels comprises multiple transmissions of RACH preamble from at least one UL beam/panel, the RACH preamble comprising a sequence, where different parameters corresponding to beam/panel IDs are used for generating the sequence.

In some embodiments, the processor receives (e.g., via the transceiver) a RRC configuration from the RAN node and stores a RRC random-access configuration table. In such embodiments, the processor also adds a new column for parameters associated with beam/panel IDs in the RRC random-access configuration table. In such embodiments, the modified RRC random-access configuration table may correlate a beam/panel ID to one or more of: a PRACH configuration index, a subframe number, and a slot number.

In some embodiments, the processor transmits (e.g., via the transceiver) multiple PRACH preambles from at least one UL beam/panel, where different configuration for each preamble is used to indicate the beam/panel ID. In such embodiments, the processor may also receive (e.g., via the transceiver) a configuration parameter from the RAN node, said configuration parameter indicating M root sequences for generating the PRACH preambles, each root sequence being associated with a UE Tx beam/panel index. In one embodiment, the RAN node configures the first apparatus with M prach-RootSequenceIndexes in SIB (i.e., for a 4-step RACH procedure). In another embodiment, the RAN node configures the first apparatus with M msgA-prach-RootSequenceIndexes in SIB (i.e., for a 2-step RACH procedure).

In some embodiments, the processor generates L PRACH preambles using L UL beams/panels and transmitting the L PRACH preambles to the RAN node, L being a positive integer. In certain embodiments, L≤min(N, M), where N represents the number of best beams/panels based on detecting the multiple SSB blocks, and where M represents a number of candidate beams/panels configured by the RAN node.

In some embodiments, the random-access procedure is a 4-step RACH procedure. In such embodiments, the processor transmits (e.g., via the transceiver) L PRACH preambles in Msg1 using L beams/panels, where the used UL beams/panels of Msg1 is implicitly indicated based on the preamble ID. In certain embodiments, the processor may also receive (e.g., via the transceiver) a second indication from the RAN node in a Msg2 for the P detected preambles each associated with a UE Tx beam/panel to be used for the following UL transmission, where P and L are positive integers with P≤L, the Msg2 being a random-access response message of the 4-step random-access procedure.

In some embodiments, the random-access procedure is a 2-step RACH procedure. In such embodiments, the processor transmits (e.g., via the transceiver) L PRACH preambles in MsgA using L beams/panels, the MsgA being a first message of the 2-step random-access procedure and being accompanied by a PUSCH transmission, wherein the used UL beams/panels of MsgA is implicitly indicated based on one of: the preamble ID and a DMRS sequence of MsgA PUSCH, or explicitly using MsgA PUSCH payload. In certain embodiments, the processor may also receive (e.g., via the transceiver) a second indication from the RAN node in a MsgB for the P detected preambles IDs each associated with a UE Tx beam/panel to be used for the following UL transmission, where P≤L, the MsgB being a random-access response message of the 2-step random-access procedure.

In some embodiments, the processor receives (e.g., via the transceiver) a configuration parameter from the RAN node. Here, the configuration parameter indicates M RACH configuration indices each associated with a UE Tx beam/panel index, where M is a positive integer. In some embodiments, the processor lists (i.e., selects) the best N beams/panels based on detecting the multiple SSB blocks, where N is a positive integer.

Disclosed herein is a first method for UL beam/panel selection indication, in accordance with aspects of the present disclosure. The first method may be performed by a UE, such as the remote unit 105, the UE 205 and/or the user equipment apparatus 1100, described above. The first method includes receiving a plurality of SSBs on at least two beams and determining a corresponding set of beams from the SSBs. The first method includes sending an indication of the corresponding set of beams from the UE to a RAN node using a random-access procedure. Note that while the first method is described in terms of receiving "beams" and identifying a "set of beams," in other embodiments the first SSB may be received via at least two UE panels, where a "set of UE panels" is then determined.

In some embodiments, the first method includes transmitting a first RACH preamble as part of the random-access procedure, the first preamble being transmitted using a first associated beam/panel, and transmitting a second RACH preamble using a second associated beam/panel if no response to the first preamble is received from the RAN node. In certain embodiments, the indication of the corresponding set of beams/panels comprises multiple transmissions of RACH preamble from at least one UL beam/panel, the RACH preamble comprising a sequence, where different parameters corresponding to beam/panel IDs are used for generating the sequence.

In some embodiments, the first method includes receiving a RRC configuration from the RAN node and storing a RRC random-access configuration table. In such embodiments, the first method also includes adding a new column for parameters associated with beam/panel IDs in the RRC random-access configuration table. In such embodiments, the modified RRC random-access configuration table may correlate a beam/panel ID to one or more of: a PRACH configuration index, a subframe number, and a slot number.

In some embodiments, the first method includes transmitting multiple PRACH preambles from at least one UL beam/panel, where different configuration for each preamble is used to indicate the beam/panel ID. In such embodiments, the first method may also include receiving a configuration parameter from the RAN node, said configuration parameter indicating M root sequences for generating the PRACH preambles, each root sequence being associated with a UE Tx beam/panel index. In one embodiment, the RAN node configures the UE with M prach-RootSequenceIndexes in SIB (i.e., for a 4-step RACH procedure). In another embodiment, the RAN node configures the UE with M msgA-prach-RootSequenceIndexes in SIB (i.e., for a 2-step RACH procedure).

In some embodiments, the first method includes generating L PRACH preambles using L UL beams/panels and transmitting the L PRACH preambles to the RAN node, L being a positive integer. In certain embodiments, L≤min(N, M), where N represents the number of best beams/panels based on detecting the multiple SSB blocks, and where M represents a number of candidate beams/panels configured by the RAN node.

In some embodiments, the random-access procedure is a 4-step RACH procedure. In such embodiments, the first method includes sending L PRACH preambles in Msg1 using L beams/panels, where the used UL beams/panels of Msg1 is implicitly indicated based on the preamble ID. In certain embodiments, the first method also includes receiving a second indication from the RAN node in a Msg2 for the P detected preambles each associated with a UE Tx beam/panel to be used for the following UL transmission, where P and L are positive integers with P≤L, the Msg2 being a random-access response message of the 4-step random-access procedure.

In some embodiments, the random-access procedure is a 2-step RACH procedure. In such embodiments, the first method includes sending L PRACH preambles in MsgA using L beams/panels, the MsgA being a first message of the 2-step random-access procedure and being accompanied by a PUSCH transmission, wherein the used UL beams/panels of MsgA is implicitly indicated based on one of: the preamble ID and a DMRS sequence of MsgA PUSCH, or explicitly using MsgA PUSCH payload. In certain embodiments, the first method also includes receiving a second indication from the RAN node in a MsgB for the P detected preambles IDs each associated with a UE Tx beam/panel to be used for the following UL transmission, where P≤L, the MsgB being a random-access response message of the 2-step random-access procedure.

In some embodiments, the first method includes receiving a configuration parameter from the RAN node. Here, the configuration parameter indicates M RACH configuration indices each associated with a UE Tx beam/panel index, where M is a positive integer. In some embodiments, the first method includes listing (i.e., internally selecting) the best N beams/panels based on detecting the multiple SSB blocks, where N is a positive integer.

Disclosed herein is a second apparatus for UL UE panel/panel selection indication, in accordance with aspects of the present disclosure. The second apparatus may be implemented by a base station, such as the base unit 121, the RAN node 605 and/or network equipment apparatus 1200, described above. The second apparatus may include at least one processor coupled with at least one memory and configured to cause the base station to transmit a plurality of synchronization signal blocks (SSBs) on at least two UE panels; perform a random-access procedure with a UE; and receive, during the random-access procedure, an indication of a corresponding set of UE panels from the UE, wherein corresponding set of UE panels are based on the SSBs. Note that while the second apparatus is described in terms of transmitting "UE panels" and receiving an indication of a "set of UE panels," in other embodiments the first SSB may be received via at least two beams, where the base station receives an indication of a "set of beams".

In some embodiments, the at least one processor may be configured to cause the base station to receive a first RACH preamble as part of the random-access procedure, the first preamble being associated with first UL UE panel/panel. In some embodiments, the indication of the corresponding set of UE panels/panels comprises multiple transmissions of RACH preamble from at least one UL UE panel/panel, the RACH preamble comprising a sequence, where different parameters corresponding to UE panel/panel IDs are used for generating the sequence.

In some embodiments, the at least one processor may be configured to cause the base station to transmit an RRC configuration to the UE, wherein the UE stores an RRC random-access configuration table. In such embodiments, the RRC random-access configuration table may correlate a UE panel/panel ID to one or more of: a PRACH configuration index, a subframe number, and a slot number.

In some embodiments, the at least one processor may be configured to cause the base station to receive multiple PRACH preambles from at least one UL UE panel/panel, where a different configuration for each preamble is used to indicate the UE panel/panel ID. In such embodiments, the at least one processor may also be configured to cause the base station to transmit a configuration parameter to the UE, said configuration parameter indicating M root sequences for generating the PRACH preambles, each root sequence being associated with a UE Tx UE panel/panel index. In one embodiment, the at least one processor may be configured to cause the base station to transmit, to the UE, a configuration with M prach-RootSequenceIndexes in SIB (i.e., for a 4-step RACH procedure). In another embodiment, the at least one processor may be configured to cause the base station to transmit, to the UE, a configuration with M msgA-prach-RootSequenceIndexes in SIB (i.e., for a 2-step RACH procedure).

In some embodiments, the at least one processor may be configured to cause the base station to receive L PRACH preambles from L UL UE panels/panels, L being a positive integer. In certain embodiments, L≤min(N, M), where N represents the number of best UE panels/panels based on the multiple SSB blocks, and where M represents a number of candidate UE panels/panels configured by the base station.

In some embodiments, the random-access procedure is a 4-step RACH procedure. In such embodiments, the at least one processor may be configured to cause the base station to receive L PRACH preambles in Msg1 using L UE panels/panels, where a respective UL UE panel/panel used to transmit a respective Msg1 is implicitly indicated based on the preamble ID. In certain embodiments, the at least one processor may also be configured to cause the base station to transmit a second indication to the UE in a Msg2 for P detected preambles each associated with a UE Tx UE panel/panel to be used for a subsequent UL transmission, where P and L are positive integers with P≤L, the Msg2 being a random-access response message of the 4-step random-access procedure.

In some embodiments, the random-access procedure is a 2-step RACH procedure. In such embodiments, the at least one processor may be configured to cause the base station to receive L PRACH preambles in MsgA using Z UE panels/panels, the MsgA being a first message of the 2-step random-access procedure and being accompanied by a PUSCH transmission, wherein the used UL UE panels/panels of MsgA is implicitly indicated based on one of: the preamble ID and a DMRS sequence of MsgA PUSCH, or explicitly using MsgA PUSCH payload. In certain embodiments, the at least one processor may also be configured to cause the base station to transmit a second indication from the RAN node in a MsgB for the P detected preambles IDs each associated with a UE Tx UE panel/panel to be used for the following UL transmission, where P≤L, the MsgB being a random-access response message of the 2-step random-access procedure.

In some embodiments, the at least one processor may be configured to cause the base station to transmit a configuration parameter to the UE, where the configuration parameter indicates M RACH configuration indices each associated with a UE Tx UE panel/panel index, where M is a positive integer.

Disclosed herein is a second method for UL beam/panel selection indication, in accordance with aspects of the present disclosure. The second method may be performed by a base station, such as the base unit 121, the RAN node 605 and/or network equipment apparatus 1200, described above. The second method includes transmitting a plurality of synchronization signal blocks (SSBs) on at least two beams. The second method includes performing a random-access procedure with a UE and receiving, during the random-access procedure, an indication of a corresponding set of beams from the UE, wherein corresponding set of beams are based on the SSBs. Note that while the second method is described in terms of transmitting "beams" and receiving an indication of a "set of beams," in other embodiments the first SSB may be received via at least two UE panels, where the base station receives an indication of a "set of UE panels".

In some embodiments, the second method includes receiving a first RACH preamble as part of the random-access procedure, the first preamble being associated with first UL beam/panel. In some embodiments, the indication of the corresponding set of beams/panels comprises multiple transmissions of RACH preamble from at least one UL beam/panel, the RACH preamble comprising a sequence, where different parameters corresponding to beam/panel IDs are used for generating the sequence.

In some embodiments, the second method includes transmitting an RRC configuration to the UE, wherein the UE stores an RRC random-access configuration table. In such embodiments, the RRC random-access configuration table may correlate a beam/panel ID to one or more of: a PRACH configuration index, a subframe number, and a slot number.

In some embodiments, the second method includes receiving multiple PRACH preambles from at least one UL beam/panel, where a different configuration for each preamble is used to indicate the beam/panel ID. In such embodiments, the second method may also include transmitting a configuration parameter to the UE, said configuration parameter indicating M root sequences for generating the PRACH preambles, each root sequence being associated with a UE Tx beam/panel index. In one embodiment, the second method includes configuring the UE with M prach-RootSequenceIndexes in SIB (i.e., for a 4-step RACH procedure). In another embodiment, the second method includes configuring the UE with M msgA-prach-RootSequenceIndexes in SIB (i.e., for a 2-step RACH procedure).

In some embodiments, the second method includes receiving L PRACH preambles from L UL beams/panels, L being a positive integer. In certain embodiments, L≤min(N, M), where N represents the number of best beams/panels based on the multiple SSB blocks, and where M represents a number of candidate beams/panels configured by the base station.

In some embodiments, the random-access procedure is a 4-step RACH procedure. In such embodiments, the second method may include receiving L PRACH preambles in Msg1 using L beams/panels, where a respective UL beam/panel used to transmit a respective Msg1 is implicitly indicated based on the preamble ID. In certain embodiments, the second method also includes transmitting a second indication to the UE in a Msg2 for P detected preambles each associated with a UE Tx beam/panel to be used for a subsequent UL transmission, where P and L are positive integers with P≤L, the Msg2 being a random-access response message of the 4-step random-access procedure.

In some embodiments, the random-access procedure is a 2-step RACH procedure. In such embodiments, the second method includes receiving L PRACH preambles in MsgA using L beams/panels, the MsgA being a first message of the 2-step random-access procedure and being accompanied by a PUSCH transmission, wherein the used UL beams/panels of MsgA is implicitly indicated based on one of: the preamble ID and a DMRS sequence of MsgA PUSCH, or explicitly using MsgA PUSCH payload. In certain embodiments, the second method also includes transmitting a second indication from the RAN node in a MsgB for the P detected preambles IDs each associated with a UE Tx beam/panel to be used for the following UL transmission, where P≤L, the MsgB being a random-access response message of the 2-step random-access procedure.

In some embodiments, the second method includes transmitting a configuration parameter to the UE, where the configuration parameter indicates M RACH configuration indices each associated with a UE Tx beam/panel index, where M is a positive integer.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A base station for wireless communication, comprising:
at least one memory; and
at least one processor coupled with the at least one memory and configure to cause the base station to:
transmit a plurality of synchronization signal blocks (SSBs) on at least two beams;
transmit a configuration for a physical random-access channel (PRACH) preamble transmission;
receive, during a random-access procedure, a plurality of PRACH preambles on a plurality of uplink (UL) beams, wherein each PRACH preamble of the plurality of PRACH preambles corresponds to a different root sequence and a respective UL beam;
associate the plurality of PRACH preambles with a user equipment (UE); and
determine, from the plurality of PRACH preambles, a corresponding set of UL beams associated with the UE, wherein the corresponding set of UL beams are based on the SSBs.

2. The base station of claim 1, wherein each PRACH preamble of the set of PRACH preambles comprises a sequence generated using different parameters corresponding to beam identities.

3. The base station of claim 1, wherein the at least one processor is configured to cause the base station to transmit a configuration parameter indicating M root sequences for generating a plurality of PRACH preambles, each root sequence associated with a UE transmit beam index.

4. The base station of claim 1, wherein the at least one processor is configured to cause the base station to transmit a Radio Resource Control (RRC) random-access configuration table from a radio access network (RAN) node, wherein the configuration comprises the RRC random-access configuration table, and wherein the RRC random-access configuration table correlates a beam identity to one or more of: a PRACH configuration index, a subframe number, a slot number, or a combination thereof.

5. The base station of claim 1, wherein to receive the plurality of PRACH preambles, the at least one processor is configured to cause the base station to receive L PRACH preambles in a message 1 (Msg1), wherein the L PRACH preambles correspond to L UL beams, and wherein the corresponding set of UL beams is implicitly indicated based on a preamble identity.

6. The base station of claim 5, wherein the at least one processor is configured to cause the base station to transmit a message 2 (Msg2) that indicates P detected preambles each associated with a UE transmit beam to be used for a following UL transmission, where P and L are positive integers with P≤L, and wherein the Msg2 comprises a random-access response message of the random-access procedure.

7. The base station of claim 5, wherein the at least one processor is configured to cause the base station to configure the UE with a number of candidate beams, wherein L≤min (N, M), where N represents a number of best beams based on the plurality of SSBs, and where M represents the number of candidate beams.

8. The base station of claim 1, wherein to receive the plurality of PRACH preambles, the at least one processor is configured to cause the base station to receive L PRACH preambles in a message-A (MsgA), wherein the L PRACH preambles correspond to L UL beams, and wherein the MsgA is accompanied by a physical uplink shared channel (PUSCH) transmission.

9. The base station of claim 8, wherein the corresponding set of UL beams is implicitly indicated based on a preamble identity or a demodulation reference signal (DMRS) sequence of the MsgA PUSCH transmission, or explicitly indicated using a payload of the MsgA PUSCH transmission.

10. The base station of claim 8, wherein the at least one processor is configured to cause the base station to transmit a second indication from a radio access network (RAN) node in a message-B (MsgB) for P detected preambles each associated with a UE transmit beam to be used for a following UL transmission, where P≤L, and wherein the MsgB comprises a random-access response message of the random-access procedure.

11. The base station of claim 8, wherein the at least one processor is configured to cause the base station to configure the UE with a number of candidate beams, wherein L≤min (N, M), where N represents a number of best beams based on the plurality of SSBs, and where M represents the number of candidate beams.

12. The base station of claim 1, wherein the at least one processor is configured to cause the base station to transmit a configuration parameter indicating M random-access configuration indices each associated with a UE transmit beam index, where Mis a positive integer.

13. A method performed by a base station, the method comprising:

transmitting a plurality of synchronization signal blocks (SSBs) on at least two beams;

transmitting a configuration for a physical random-access channel (PRACH) preamble transmission;

receiving, during a random-access procedure, a plurality of PRACH preambles on a plurality of uplink (UL) beams, wherein each PRACH preamble of the plurality of PRACH preambles corresponds to a different root sequence and a respective UL beam;

associating the plurality of PRACH preambles with a user equipment (UE); and determining, from the plurality of PRACH preambles, a corresponding set of UL beams associated with the UE, wherein the corresponding set of UL beams are based on the SSBs.

14. The method of claim 13, wherein each PRACH preamble of the set of PRACH preambles comprises a sequence generated using different parameters corresponding to beam identities.

15. The method of claim 13, further comprising transmitting a configuration parameter indicating M root sequences for generating a plurality of PRACH preambles, each root sequence associated with a UE transmit beam index.

16. The method of claim 13, wherein receiving the plurality of PRACH preambles, further comprises receiving L PRACH preambles in a message 1 (Msg1), wherein the L PRACH preambles correspond to L UL beams, and wherein the corresponding set of UL beams is implicitly indicated based on a preamble identity.

17. The method of claim 16, further comprising transmitting a message 2 (Msg2) that indicates P detected preambles each associated with a UE transmit beam to be used for a following UL transmission, where P and L are positive integers with P≤L, and wherein the Msg2 comprises a random-access response message of the random-access procedure.

18. The method of claim 13, wherein receiving the plurality of PRACH preambles further comprises receiving L PRACH preambles in a message-A (MsgA), wherein the L PRACH preambles correspond to L UL beams, and wherein the MsgA is accompanied by a physical uplink shared channel (PUSCH) transmission.

19. The method of claim 18, wherein the corresponding set of UL beams is implicitly indicated based on a preamble identity or a demodulation reference signal (DMRS) sequence of the MsgA PUSCH transmission, or explicitly indicated using a payload of the MsgA PUSCH transmission.

20. The method of claim 18, further comprising transmitting a second indication from a radio access network (RAN) node in a message-B (MsgB) for P detected preambles each associated with a UE transmit beam to be used for a following UL transmission, where P≤L, and wherein the MsgB comprises a random-access response message of the random-access procedure.

* * * * *